United States Patent

Tasaka

Patent Number: 5,936,037
Date of Patent: Aug. 10, 1999

[54] THERMOPLASTIC ELASTOMERIC RESIN COMPOSITION AND A PROCESS FOR THE PREPARATION THEREOF

[75] Inventor: Michihisa Tasaka, Kawasaki, Japan

[73] Assignee: Riken Vinyl Industry Co., Ltd., Tokyo, Japan

[21] Appl. No.: 08/864,061

[22] Filed: May 27, 1997

[30] Foreign Application Priority Data

May 28, 1996 [JP] Japan ................................ 8-156047
May 13, 1997 [JP] Japan ................................ 9-137426

[51] Int. Cl.$^6$ ........................................ C08L 53/02
[52] U.S. Cl. ........................ 525/92 B; 525/64; 525/66; 525/92 C; 525/92 F; 524/504; 524/505
[58] Field of Search ............... 525/92 F, 64, 525/66, 92 B, 92 C; 524/504, 505

[56] References Cited

U.S. PATENT DOCUMENTS

| | | | |
|---|---|---|---|
| 4,808,561 | 2/1989 | Welborn, Jr. | 502/104 |
| 4,897,455 | 1/1990 | Welborn, Jr. | 526/129 |
| 5,191,052 | 3/1993 | Welborn, Jr. | 526/339 |
| 5,391,607 | 2/1995 | Fujii | 525/64 |
| 5,550,190 | 8/1996 | Hasegawa | 525/92 F |

FOREIGN PATENT DOCUMENTS

| | | |
|---|---|---|
| 770645 | 5/1997 | European Pat. Off. |
| 40-23798 | 10/1965 | Japan |
| 50-14742 | 2/1975 | Japan |
| 52-26551 | 2/1977 | Japan |
| 58-132032 | 8/1983 | Japan |
| 58-145751 | 8/1983 | Japan |
| 59-6236 | 1/1984 | Japan |
| 59-53548 | 3/1984 | Japan |
| 61-141743 | 6/1986 | Japan |
| 61-218650 | 9/1986 | Japan |
| 62-48757 | 3/1987 | Japan |
| 63-57662 | 3/1988 | Japan |
| 1-139241 | 5/1989 | Japan |
| 1-230660 | 9/1989 | Japan |
| 2-97554 | 4/1990 | Japan |
| 3-11291 | 1/1991 | Japan |
| 3-100045 | 4/1991 | Japan |
| 3-163088 | 7/1991 | Japan |
| 3-234745 | 10/1991 | Japan |
| 3-234755 | 10/1991 | Japan |
| 4-20549 | 1/1992 | Japan |
| 4-255742 | 9/1992 | Japan |
| 5-171003 | 7/1993 | Japan |
| 5-214209 | 8/1993 | Japan |
| 7-126474 | 5/1995 | Japan |

Primary Examiner—Patricia A. Short
Attorney, Agent, or Firm—Cowan, Liebowitz & Latman, P.C.; William H. Dippert

[57] ABSTRACT

The invention provides a process for the preparation of a thermoplastic elastomeric resin composition comprising melt kneading (a) 100 parts by weight of a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer, (b) 20 to 300 parts by weight of a non-aromatic softening agent for rubber, (c) 1 to 150 parts by weight of a peroxide-crosslinking type olefinic resin and/or a copolymeric rubber containing said resin, and (d) 10 to 150 parts by weight of a peroxide-decomposing type olefinic resin and/or a copolymer containing said resin, characterized in that the process comprises a step of heat-processing component (a), component (b), at least a part of component (c), at least a part of component (d) and at least a part of 1.0 to 1,200 parts by weight of component (e) in the presence of an organic peroxide to cause crosslinking, wherein component (e) is at least one thermoplastic polymer selected from the group consisting of polyester type (co)polymers, polyamide type (co)polymers and polyurethane type (co)polymers, and a subsequent step of blending these with the remaining part of component (c), and, the remaining part of component (d) and component (e), if any. The obtained composition is soft and excellent in heat deformation resistance and mechanical strength, moldability and processability, particularly in oil resistance and stain resistance.

14 Claims, 1 Drawing Sheet

THERMOPLASTIC ELASTOMERIC RESIN COMPOSITION AND A PROCESS FOR THE PREPARATION THEREOF

FIELD OF THE INVENTION

The present invention relates to a thermoplastic elastomeric resin composition and a process for the preparation thereof.

The present composition may be added as a softening agent to a thermoplastic elastomer such as polyester type resins, polyolefine type resins, plyurethane type resins, vinyl aromatic type resins and polyamide type resins.

PRIOR ART

Thermoplastic elastomeric resins which are rubber-like materials, do not need a vulcanization process and have thermoplastic resin-like molding processability are attracting attention in the fields of auto parts, parts for electric appliances, electric wire insulation, footwears and general goods.

Various types of such thermoplastic elastomeric resins have been developed and put on sale, such as polyolefine type, polyurethane type, polyester type, polystyrene type, polyvinyl chloride type and polyamide type.

Among those, polystyrene type thermoplastic elastomeric resins such as styrene-butadiene block copolymers (SBS) and styrene-isoprene block copolymers (SIS) and hydrogenated resins thereof have high softness and good rubber elasticity at normal temperature. Further, thermoplastic elastomeric resin compositions obtained from these show good processability.

However, these polymers have problems in resistance to weathering as they have double bonds in conjugated diene blocks in molecule.

To overcome the problems, the double bonds in block copolymers of styrene and conjugated diene are hydrogenated to give elastomeric resins with improved thermal stability.

Several thermoplastic elastomeric resin compositions of such hydrogenated ones have been proposed, for instance, in Japanese Patent Application Laid-Open (hereinafter refereed to as JP Laid-Open) Nos. 50-14742/1975 and 52-26551/1977. As modification of these, JP Laid-Open Nos. 58-132032/1983, 58-145751/1983, 59-53548/1984 and 62-48757 disclose compositions comprising a hydrogenated styrene-conjugated diene block copolymer, a hydrocarbon and an alpha-olefin polymeric resin, and a process for the preparation thereof.

Unfortunately, the thermoplastic elastomeric resin compositions of the prior art comprising such hydrogenated block copolymers have a drawback in rubber properties, such as deformation under heat and pressure (compression set) and rubber elasticity at a high temperature.

To solve such a drawback, there have been proposed a cross-linking composition in which a silane compound is added to a composition containing such a hydrogenated block copolymer, and cross-linked one obtained by cross-linking a composition containing such a hydrogenated block copolymer in the presence of an organic peroxide, for instance, in JP Laid-Open Nos. 59-6236/1984 and 63-57662/1987, Japanese Patent Publication Nos. 3-49927/1991, 3-11291/1991 and 6-13628/1994.

However, such proposed cross-linked compositions of the hydrogenated block copolymer are unsatisfactory in compression set at a high temperature, particularly at 100° C. and, moreover, tensile properties deteriorate considerably at 80° C. or more. Further, such compositions do not meet the levels of properties required in the fields of vulcanized rubber. Particularly, good processability cannot be attained, and the mechanical strength is low.

To solve such drawbacks, in JP Laid-Open No. 4-20549/1992, there is desclosed a polymer in which a component composed of carboxylic acid derivatives and/or epoxy derivatives is copolymerized with or graft polymerized to such a block copolymer, or in which other polymers are graft or block bonded to such a block copolymer, and, further, a polyamide type polymer and/or polyester type polymer are added to a composition of a hydrogenated block copolymer, and crosslinked in the presence of an organic peroxide.

However, the crosslinked composition of the hydrogenated block copolymer desclosed has problems. That is, compression set at a high temperature, particularly at 100° C. or more is high and tensile properties are poor. Further, balance between compression set and hardness is bad.

In addition, in the case of blending polyamide type polymer, polyester type polymer and/or polyurethane type polymer, hardness is not less than HSA 85, which is little different from that of polyamide type polymer, polyester type polymer or polyurethane type polymer.

In JP Laid-Open Nos. 1-139241/1989 and 3-100045/1991, there is desclosed a melting blended substance of a thermoplastic elastic body selected from hydrogenated SBS block copolymers, olefin type elastomers, diene type elastomers, urethane type elastomers and plasticized polyvinyl chlorides and a polyester type thermoplastic elastomer or a polyether block amide.

However, this composition is poor in balance between compression set and hardness and shows unsufficient compatibility, so that the abrasion resistance is bad.

Further, JP Laid-Open No. 5-214209/1993 discloses a composition in which a modified polystyrene type resin and/or a modified polyolefin type resin having an epoxy, acid anhydride or oxazoline group is added to a composition containing a hydrogenated derivative of a block copolymer and a polyester typer resin, whereby the composition is improved in compatibility and excellent in softness, heat resistance and chemical resistance. JP Publication No. 5-75016/1993 (i.e., Laid Open No. 1-230660/1989) discloses a composition which comprises a hydrogenated derivative of a block copolymer and a hydrogenated derivative having a carboxylic acid group or a derivative group thereof together with a polyolefin resin and a thermoplastic polyester. JP Laid-Open Nos. 3-234745/1991, 3-234755/1991, 5-171003/1993 and 7-126474/1995 disclose a composition which comprises a hydrogenated derivative of a block copolymer and a hydrogenated derivative having a carboxylic acid group or a derivative group thereof together with a thermoplastic polyurethane. JP Laid-Open No. 2-97554/1990 discloses a composition which comprises a hydrogenated derivative of a block copolymer and a hydrogenated derivative having an epoxy group or a derivative group thereof together with a thermoplastic polyurethane.

However, those components have drawbacks. That is, compression set at a high temperature, particularly at 100° C. or more is high and tensile properties are poor. In addition, balance between the compression set and hardness is bad.

Although, the aforesaid compositions are excellent in initial chemical resistance, they swell extremely and cannot maintain its form in long time dipping or dipping at 100° C. or more, because such treatment as crosslinking is not carried out on a soft segment of the hydrogenated block copolymer.

SUMMARY OF THE INVENTION

A purpose of the invention is to provide a process for the preparation of a thermoplastic elastomeric resin composition which is soft and excellent in heat deformation resistance, mechanical strength, moldability, processability, particularly, oil resistance and stain resistance.

Another purpose of the invention is to provide such a thermoplastic elastomeric resin composition.

Thus, the invention provides a process for the preparation of a thermoplastic elastomeric resin composition comprising melt kneading (a) 100 parts by weight of a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer, (b) 20 to 300 parts by weight of a non-aromatic softening agent for rubber, (c) 1 to 150 parts by weight of a peroxide-crosslinking type olefinic resin and/or a copolymeric rubber containing said resin, and (d) 10 to 150 parts by weight of a peroxide-decomposing type olefinic resin and/or a copolymer containing said resin, characterized in that the process comprises a step of heat-processing component (a), component (b), at least a part of component (c), at least a part of component (d) and at least a part of 1.0 to 1,200 parts by weight of component (e) in the presence of an organic peroxide to cause crosslinking, wherein component (e) is at least one thermoplastic polymer selected from the group consisting of polyester type (co)polymers, polyamide type (co)polymers and polyurethane type (co) polymers, and a subsequent step of blending these with the remaining part of component (c), and the remaining part of component (d) and component (e), if any. This process will be hereinafter referred to as process (P-1).

In a preferred embodiment, component (c) is one which is modified with a carboxyl, acid anhydride, epoxy or oxazolinyl group.

In another preferred embodiment, (f) 0 to 100 parts by weight of a hydrogenated petroleum resin are further blended before said heat-processing.

In another preferred embodiment, (g) 0 to 100 parts by weight of an inorganic filler are blended in any step.

In another preferred embodiment, at least 3 parts by weight of component (d) are subjected to said heat-processing in the presence of an organic peroxide and at least 5 parts by weight of component (d) are blended after said heat-processing.

In another preferred embodiment, at least 1 part by weight of component (c) is subjected to said heat-processing.

In another preferred embodiment, at least 10 parts by weight of component (e) are subjected to said heat-processing.

In another preferred embodiment, the crosslinking is carried out in the presence of a crosslinking aid which is a monomer having an ethylenically unsaturated group.

In another preferred embodiment, the organic peroxide is used in an amount of 0.1 to 4.0 parts by weight.

The invention also provides a thermoplastic elastomeric resin composition comprising (a) 100 parts by weight of a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer, (b) 20 to 300 parts by weight of a non-aromatic softening agent for rubber, (c) 1 to 150 parts by weight of a peroxide-crosslinking type olefinic resin and/or a copolymeric rubber containing said resin, and (d) 10 to 150 parts by weight of a peroxide-decomposing type olefinic resin and/or a copolymer containing said resin, characterized in that said composition further comprises (e) 1.0 to 1,200 parts by weight of at least one polymer selected from the group consisting of polyester type (co)polymers, polyamide type (co)polymers and polyurethane type (co)polymers, and component (c) is modified with a group which is able to react with a hydroxyl, carboxyl or amino group. This composition will be hereinafter referred to as composition (C-1).

In a preferred embodiment, component (c) is one which is modified with a carboxyl, acid anhydride, epoxy or oxazolinyl group.

In another preferred embodiment, the composition further comprises (f) 0 to 100 parts by weight of a hydrogenated petroleum resin.

In another preferred embodiment, the composition further comprises (g) at most 100 parts by weight of an inorganic filler.

In another preferred embodiment, the composition further comprises 0.1 to 10 parts by weight of a crosslinking aid which is a monomer having an ethylenically unsaturated group.

Another purpose of the invention is to provide a process for the preparation of a thermoplastic elastomeric resin composition which is soft and excellent in heat deformation resistance, moldability, particularly, oil resistance and abrasion resistance, and in mechanical properties at high temperatures.

Further purpose of the invention is to provide such a thermoplastic elastomeric resin composition.

The present inventors have now found the following. If component (d), peroxide-decomposing type olefinic resin and/or a copolymer containing said resin, is melt kneaded all in step (I) which will be mentioned below, most of (d) is decomposed by the molecule cutting action of an organic peroxide. Therefore, the flowability of the composition is extremely decreased and homogeneous dispersion of other components can not be obtained. Accordingly, physical properties, such as tensile properties, are decreased and delamination is observed in the elastomeric composition obtained. Meanwhile, if component (d) is not blended at all in step (I), the flowability of the composition is not improved during melt kneading. Particularly, dispersion of component (a) is poor and, therefore, cross linking cannot be carried out in a good dispersing state, which causes deterioration in physical properties such as tensile properties or delamination in the elastomeric composition obtained.

Meanwhile, if allocated parts of component (d) are blended and melt kneaded in steps (I) and (II), the deterioration in the physical properties mentioned above does not occure in the elastomeric composition obtained, and good appearance, adjustment of hardness and shrinkage factor may be effectively achieved as envisaged by blending component (d).

Then, the invention further provides a process for the preparation of a thermoplastic elastomeric resin composition comprising melt kneading (a) 100 parts by weight of a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer, (b) 20 to 240 parts by weight of a non-aromatic softening agent for rubber, and (d) 5 to 100 parts by weight of a peroxide-decomposing type olefinic resin and/or a copolymeric rubber containing said resin, characterized in that the process comprises the following steps:

(I) melt kneading the whole amounts of components (a) and (b) and the whole amounts of (k) 1 to 30 parts by weight of liquid polybutadiene, (l) 0.01 to 15 parts by weight of an unsaturated glycidyl compound or derivative thereof, and (m) 0.01 to 15 parts by weight of an unsaturated carboxylic acid or derivative thereof, and a part of component (d), and, at the same time or subsequently, melt kneading these with the whole of (h) 0.1 to 3.5 parts by weight of an organic peroxide per 100 parts by weight of a total amount of components (a), (b), (d) and (k), and (II) melt kneading the product obtained from step (I) with the remaining part of component (d). This process will be hereinafter referred to as process (P-2).

In step (I) of the aforesaid present process, component (d) is decomposed by the action of (h) organic peroxide to enhance the flowability of the composition and, at the same time, to generate radicals which crosslink component (a) by a chain reaction and alternatively react with functional groups of other components. In step (II), component (d) is homogeneously dispersed in a matrix resin composed mainly of the crosslinked (a) to achieve the purposes of the present invention. Here, components (b) and (k), alone or by interacting with each other, give softness to the elastomeric composition obtained. Components (l) and (m) behave as a modifier to enhance a compatibilizing effect. An optional component (c) further enhances the crosslinking effect of component (a) under the action of (h) organic peroxide.

In a preferred embodiment, a weight ratio of the amount of component (d) blended in step (I) and that in step (II) is 10:90 to 90:10.

In another preferred embodiment, the whole of (c) at most 100 parts by weight of a peroxide-crosslinking type olefinic resin and/or a copolymeric rubber containing said resin are also melt kneaded first in step (I), where the amount of the organic peroxide (h) is 0.1 to 3.5 parts by weight per 100 parts by weight of a total amount of components (a), (b), (c), (d) and (k).

In another preferred embodiment, (i) 0.1 to 3.5 parts by weight of a crosslinking aid per 100 parts by weight of a total amount of components (a), (b), (d) and (k) are kneaded together with component (h) in step (I).

The invention also provides a thermoplastic elastomeric resin composition comprising (a) 100 parts by weight of a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer, (b) 20 to 240 parts by weight of a non-aromatic softening agent for rubber, and (d) 5 to 100 parts by weight of a peroxide-decomposing type olefinic resin and/or a copolymeric rubber containing said resin, characterized in that said composition further comprises (k) 1 to 30 parts by weight of liquid polybutadiene, (l) 0.01 to 15 parts by weight of an unsaturated glycidyl compound or derivative thereof, and (m) 0.01 to 15 parts by weight of an unsaturated carboxylic acid or derivative thereof. This composition will be hereinafter referred to as composition (C-2).

In a preferred embodiment, the composition further comprises (n) 10 to 1,500 parts by weight of at least one material selected from the group consisting of polyester (co)polymers, polyurethane (co)polymers, polyamide (co)polymers and polymethylpentene (co)polymers.

In another preferred embodiment, the composition further comprises (c) 0 to 100 parts by weight of a peroxide-crosslinking type olefinic resin and/or a copolymeric rubber containing said resin.

The present inventors have further found that when component (n) which will be described below is further blended, even if component (d) is kneaded all in step (I), it is possible to obtain a composition having various properties which is not inferior to those of the one prepared in the aforesaid processes (P-1 and P-2) and further to give good heat resistance to it.

The invention further provides a process for the preparation of a thermoplastic elastomeric resin composition comprising melt kneading (a) 100 parts by weight of a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer, (b) 20 to 240 parts by weight of a non-aromatic softening agent for rubber, and (d) 5 to 100 parts by weight of a peroxide-decomposing type olefinic resin and/or a copolymeric rubber containing said resin, characterized in that the process comprises the following steps:

(I) melt kneading the whole amounts of components (a), (b) and (d) and the whole amounts of (k) 1 to 30 parts by weight of liquid polybutadiene, (l) 0.01 to 15 parts by weight of an unsaturated glycidyl compound or derivative thereof, and (m) 0.01 to 15 parts by weight of an unsaturated carboxylic acid or derivative thereof, or the whole amounts of components (a), (b), (d), (k), (l) and (m) and the whole or a part of (n) 10 to 1,500 parts by weight of at least one material selected from the group consisting of polyester (co)polymers, polyurethane (co)polymers, polyamide (co)polymers and polymethylpentene (co)polymers, and, at the same time or subsequently, melt kneading these with the whole of (h) 0.1 to 3.5 parts by weight of an organic peroxide per 100 parts by weight of a total amount of components of (a), (b), (d) and (k), and (II) further melt kneading the product obtained from step (I) with the remaining part of component (n), if any. This process will be hereinafter referred to as process (P-3).

In the above process, component (n) interacts with component (k) grafted to component (a) and functional groups of components (l) and (m), such as hydroxyl groups or carboxyl groups, to achieve the present effects.

For component (n), if use is made of a material of which melting point is much higher than that of the matrix resin, such as polymethylpentene or nylon-6, it is preferred to conduct the melt kneading for a longer time in order to disperse it homogeneously in the matrix resin. Such materials that have a comparatively high melting point decompose with difficulty and, therefore, do not cause deterioration in physical properties of the resin composition. It is rather preferred to blend and melt knead such materials in step (I) so as to disperse them homogeneously in the matrix resin.

Meanwhile, if, component (n) is a material of which melting point is not mush higher than that of the matrix resin, such a material decompose easily. Accordingly, when it is blended and melt kneaded in step (I), physical properties of the elastomeric resin composition obtained are decreased in some cases. Preferably, a most amount of such a material is blended and melt kneaded in step (II).

In a preferred embodiment, component (n) is polymethylpentene or nylon-6, and the whole or a part of component (n) is melt kneaded in step (I) or the whole of component (n) is melt kneaded in step (II) without melt kneading component (n) in step (I).

In another preferred embodiment, a part or none of component (n) is melt kneaded in step (I) and the remaining part of component (n) is melt kneaded in step (II).

In another preferred embodiment, a part or none of component (n) is melt kneaded in step (I) and the remaining part of component (n) is melt kneaded in step (II), wherein a weight ratio of component (n) blended in step (I) and that in step (II) is 10:90 to 0:100.

In another preferred embodiment, a part or none of component (n) is melt kneaded in step (I) and the remaining part of component (n) is melt kneaded in step (II), wherein component (n) is a thermoplastic polyester type elastomer, thermoplastic polyamide type elastomer or thermoplastic polyurethane type elastomer.

In another preferred embodiment, (i) 0.1 to 3.5 parts by weight of a crosslinking aid per 100 parts by weight of a total amount of components (a), (b), (d) and (k) are kneaded together with component (h) in step (I).

In another preferred embodiment, the whole of (c) at most 100 parts by weight of a peroxide-crosslinking type olefinic resin and/or a copolymeric rubber containing said resin are also melt kneaded first in step (I), where the amount of the organic peroxide (h) is 0.1 to 3.5 parts by weight per 100 parts by weight of a total amount of components (a), (b), (c), (d) and (k).

PREFERRED EMBODIMENTS OF THE INVENTION

Component (a), Block Copolymer

Figure 1:
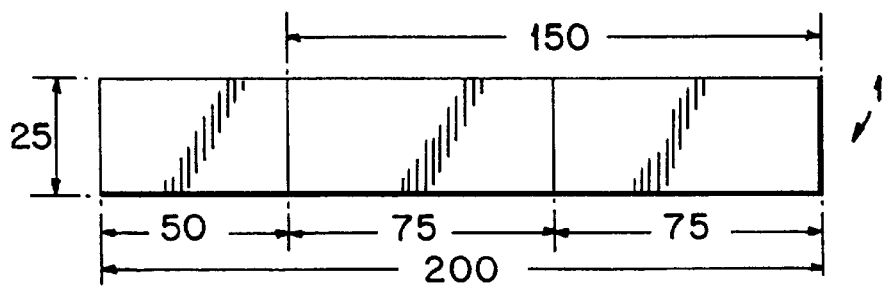
FIG. 1 is a plan view of a test piece before being bent for evaluation of adhesive property.

Component (a) used in the invention is a block copolymer consisting of at least two polymeric blocks (A) composed mainly of a viny aromatic compound and at least one polymeric block (B) composed mainly of a conjugated diene compound, or a hydrogenated block copolymer obtained by hydrogenating said block copolymer, or a mixture thereof, such as vinyl aromatic compound-conjugated diene compound block copolymers having a structure, A-B-A, B-A-B-A or A-B-A-B-A, or those obtained by hydrogenating such. The block copolymer and/or the hydrogenated block copolymer (hereinafter referred to as (hydrogenated) block copolymer) contains 5 to 60% by weight, preferably 20 to 50% by weight, of a vinyl aromatic compound. Preferably, the polymeric block A composed mainly of a vinyl aromatic compound consists wholly of a vinyl aromatic compound or is a copolymeric block comprising more than 50% by weight, preferably at least 70% by weight, of a vinyl aromatic compound and an optional component such as a conjugated diene compound and/or a hydrogenated conjugated diene compound (hereinafter referred to as (hydrogenated) conjugated diene compound). Preferably, the polymeric block B composed mainly of a (hydrogenated) conjugated diene compound is composed solely of a (hydrogenated) conjugated diene compound or is a copolymeric block comprising more than 50% by weight, preferably at least 70% by weight, of a (hydrogenated) conjugated diene compound with an optional component such as a vinyl aromatic compound. The vinyl compound or the (hydrogenated) conjugated diene compound may be distributed at random, in a tapered manner (i.e., a monomer content increases or decreases along a molecular chain), in a form of partial block or mixture thereof in the polymeric block A composed mainly of a vinyl aromatic compound or the polymeric block B composed mainly of a (hydrogenated) conjugated diene compound, respectively. When two or more of the polymeric block A composed mainly of a vinyl aromatic compound or two or more of the polymeric block B composed mainly of a (hydrogenated) conjugated diene compound are present, they may be same with or different from each other in structure.

The vinyl aromatic compound to compose the (hydrogenated) block copolymer may be one or more selected from, for instance, styrene, α-methyl styrene, vinyl toluene and p-tert.-butyl styrene, preferably styrene. The conjugated diene compound may be one or more selected from, for instance, butadiene, isoprene, 1,3-pentadiene, and 2,3-dimethyl-1,3-butadiene, preferably butadiene and/or isoprene.

Any micro structure may be selected in the polymeric block B composed mainly of the conjugated diene compound. It is preferred that the butadiene block has 20 to 50%, more preferably 25 to 45%, of 1,2-micro structure. In the polyisoprene block, it is preferred that 70 to 100% by weight of isoprene is in 1,4-micro structure and at lest 90% of the aliphatic double bonds derived from isoprene is hydrogenated.

A weight average molecular weight of the (hydrogenated) block copolymer with the aforesaid structure to be used in the invention is preferably 5,000 to 1,500,000, more preferably 10,000 to 550,000, further more preferably 100,000 to 550,000, particularly 100,000 to 400,000. A number average molecular weight is preferably 5,000 to 1,500,000, more preferably 10,000 to 550,000, particularly 100,000 to 400,000. A ratio of the weight average molecular weight (Mw) to the number average molecular weight (Mn), Mw/Mn, is preferably 10 or less, more preferably 5 or less, particularly 2 or less.

Molecule structure of the (hydrogenated) block copolymer may be linear, branched, radial or any combination thereof.

Many methods were proposed for the preparation of such block copolymers. As described, for instance, in JP Publication 40-23798/1965, block polymerization may be carried out using a lithium catalyst or a Ziegler catalyst in an inert solvent. The hydrogenated block copolymer may be obtained by hydrogenating the block copolymer thus obtained in the presence of a hydrogenation catalyst in an inert solvent.

Examples of the (hydrogenated) block copolymer include SBS, SIS, SEBS and SEPS. A particularly preferred (hydrogenated) block copolymer in the invention is a hydrogenated block copolymer with a weight average molecular weight of 50,000 to 550,000 which is composed of polymeric block A composed mainly of styrene and polymeric block B which is composed mainly of isoprene and in which 70 to 100% by weight of isoprene has 1,4-micro structure and 90% of the aliphatic double bonds derived from isoprene is hydrogenated. More preferably, 90 to 100% by weight of isoprene has 1,4-micro structure in the aforesaid hydrogenated block copolymer.

Component (b), Non-Aromatic Softening Agent for Rubber

Non-aromatic mineral oils and non-aromatic liquid or low molecular weight synthetic softening agents may be used as component (b) of the invention. Mineral oil softening agents used for rubber are mixtures of aromatic cyclic ones, napthhenic cyclic ones and paraffinic ones. Those in which 50% or more of the whole carbon atoms is in paraffinic chains are called a paraffinic type; those in which 30 to 40% of the whole carbon atoms is in naphthenic rings are called a naphthenic type; and those in which 30% or more of the whole carbon atoms is in aromatic rings are called an aromatic type.

Mineral oil softening agents for rubber to be used as component (b) according to the invention are of the aforesaid paraffinic or naphthenic type. Aromatic softening agents are improper, because they make component (a) soluble and hinder the crosslinking reaction so that physical properties of a composition obtained are not improved. Paraffinic ones are preferred as component (b). Among the paraffinic ones, those with a less content of aromatic cyclic components are particularly preferred.

The non-aromatic softening agents for rubber have a kinetic viscosity at 37.8° C. of 20 to 500 cSt, a pour point of −10 to −15° C. and a flash point (COC) of 170 to 300° C.

In process P-1 and composition C-1, component (b) is blended in an amount of 20 to 300 parts by weight, preferably 40 to 300 parts by weight, more preferably 80 to 200 parts by weight, most preferably 100 to 170 parts by weight, per 100 parts by weight of component (a). In processes P-2 and P-3 and composition C-2, component (b) is blended in an amount of at most 240 parts by weight, preferably at most 200 parts by weight, more preferably at most 150 parts by weight, and at least 20 parts by weight, preferably 80 parts by weight, more preferably at least 100 parts by weight, per 100 parts by weight of component (a). In these processes, if component (b) is used in an amount more than the upper limit, bleed-out of the softening agent tends to take place, a final product might be sticky, and mechanical properties are deteriorated. In process P-1 and composition C-1, if it is used in an amount of less than 20 parts by weight, moldability of the composition is lost. In processes P-2 and 3 and composition C-2, if it is used in an amount less than 20 parts by weight, there is no problem in practice, but a load to the extruder increases during the process and molecule cutting occurs due to exothermic shearing. The softness of the composition deteriorates, too.

In process P-1, a part of component (b) may be blended after the heat processing in the presence of a peroxide, but this may cause bleed-out. Component (b) preferably has a weight average molecular weight of 100 to 2,000.

Component (c), Peroxide-Crosslinking Type Olefinic Resin or A Copolymeric Rubber Containing The Same As component (c) of the invention, use may be made of those which cause, mainly, cross-linking by being heat-treated in the presence of peroxide so that its flowability decreases. Examples of such include polyethylene having a polymer density of 0.88 to 0.94 g/cm$^3$, for instance, high density polyethylene (polyethylene prepared in a low pressure method), low density polyethylene (polyethylene prepared in a high pressure method), linear low density polyethylene (copolymers of ethylene with a smaller amount of α-olefin such as butene-1, hexene-1 or octene-1) and ultralow density polyethylene; olefinic copolymers such as ethylene-propylene copolymer, ethylene-vinyl acetate copolymer, ethylene-acrylate copolymer, and amorphous random copolymeric elastomers composed mainly of olefins such as ethylene-propylene copolymeric rubber and ehtylene-proplyrene-non-conjugated diene copolyemeric rubber.

These may be modified with a group which is able to react with a hydroxyl, carboxyl or amino group. The modified (co)polymers are preferable in process P-1. The modification is essential in composition C-1. Examples of such include (co)polymers modified with, for example, maleic anhydride, glycidyl methacrylate, allylglycidylether, oxazolyl methacrylate, allyloxazolylether, carboxylmethacrylate and allylcarboxylether, and polymethylmethacrylate graft copolymers.

In process P-1 and composition C-1, modified polyethylene and modified ethylene-propylene copolymeric rubber are preferred. When polyester type polymer is used as component (e), glycidyl methacrylate copolymers are particularly preferred, while when polyamide type copolymer is used as component (e), ethylene-glycidyl methacrylate copolymers modified with maleic anhydride are particularly preferred. In these cases, proper crosslinked structure and compatibility may be obtained. In process P-1 and composition C-1, because functional groups of a principal chain of a peroxide-crosslinking type modified olefinic polymer interact with component (e), improvement in tensile properties may be effected. In the present invention, delamination on the surface of a molded article does not occur.

In processes P-2 and P-3 and composition C-2, preference is given to an ethylene-octene copolymer having a density of at most 0.90 g/cm$^3$ and ethylene-hexene copolymer having a density of at least 0.90 g/cm$^3$ which are prepared using a metallocene catalyst (single site catalyst). When Tm of these copolymer is not higher than 100° C., it is necessary to add and crosslink them by the time of crosslinking at the latest. Tm disappears by the crosslinking and, therefore, fusion of octene or hexene does not occur. If the addition of them is carried out after the crosslinking, fusion at 30 to 60° C. of octene or hexene remains and, therefore, the heat resistance is decreased.

In processes P-2 and 3 and composition C-2, one example of component (c) is an olefinic polymer which is prepared using a catalyst for olefine polymerization which is prepared in accordance with the method described in Japanese Patent Application Laid-Open Sho-61-296008 and which is composed of a carrier and a reaction product of metallocene having at least one metal selected from the 4b group, 5b group and 6b group in the periodic table with alumoxane, the reaction product being formed in the presence of the carrier.

Another example of component (c) is an olefinic polymer prepared using a metal coordinated complex described in Japanese Patent Application Laid-Open Hei-3-163088, which metal coordinated complex contains a metal selected from the group 3 (except scandium), groups 4 to 10 and the lanthanoid group and a delocalized π-bonding part substituted by a constrained inducing part, and is characterized in that said complex has a constrained geometrical form around said metal atom, and a metal angle between a center of the delocalized substituted π-bonding part and a center of at least one remaining substituted part is less than that in a comparative complex which is different from it only in that a constrained inducing substituted part is substituted with a hydrogen, and wherein in each complex having further at least one delocalized substituted π-bonding part, only one, per metal atom, of the delocalized substituted π-bonding parts is cyclic.

When component (c) is rubber, its Mooney viscosity, ML1+4 (100° C.), is preferably 10 to 120, more preferably 40 to 100. If rubber with a Mooney viscosity less than 10 is used, rubber properties of the elastomer composition obtained are deteriorated. If rubber with a Mooney viscosity more than 120, moldability is deteriorated and, particularly, appearance of a molded article is deteriorated.

An ethylene content in the copolymer is properly 5 to 50% by weight, preferably 6 to 20% by weight, more preferably 10 to 15% by weight. If the ethylene content is less than 5% by weight, softness of the elastomer composition obtained is insufficient. If it is larger than 50% by weight, mechanical strength is deteriorated.

The peroxide-crosslinking type olefinic resin or the copolymer containing the same preferably has a weight average molecular weight of 50,000 to 1,000,000, more preferably 70,000 to 500,000. If it is less than 50,000, rubber properties of the elastomer composition obtained are deteriorated. If it exceeds 1,000,000, moldability is deteriorated and, particularly, appearance of a molded article is deteriorated.

In process P-1 and composition C-1, component (c) is blended in an amount of 1 to 150 party by weight, preferably 3 to 50 parts by weight, per 100 parts by weight of component (a). If the amount is less than 1 part by weight, compatibility in the composition obtained is insufficient and, therefore, mechanical properties are deteriorated. If it exceeds 150 parts by weight, compression set of the elastomer composition obtained are deteriorated. In process P-1, preferably, at least 1 part by weight of component (c) is blended before the heat treatment in the presence of peroxide.

In processes P-2 and 3 and the composition C-2, an MFR determined at 190° C. and a load of 2.16 kg is preferably 0.1 to 10.0 g/10 min., more preferably 0.3 to 5.0 g/10 min. Component (c) is blended in an amount of at most 100 parts by weight, preferably at most 50 parts by weight, and preferably at least 5 parts by weight, per 100 parts by weight of component (a). If the upper limit is not kept, softness of the elastomer composition obtained is lost and bleedout of softening agent (b) occurs easily.

Component (d), Peroxide-Decomposing Type Olefinic Resin or A Copolymer Containing The Same First, component (d) in process P-1 and composition C-1 will be described. Component (d) attains an effect of improving dispersion of the rubber in the composition obtained so as to improve appearance of a molded article. Component (d) is blended in an amount of 10 to 150 parts by weight, preferably 25 to 100 parts by weight, per 100 parts by weight of component (a). If the amount is less than 10 parts by weight, moldability of the elastomer composition obtained is deteriorated. If it exceeds 150 parts by weight, softness and rubber elasticity of the elastomer composition are deteriorated.

A peroxide-decomposing type olefinic resin suitable as component (d) of the invention has at least 20% of rrrr/1-mmmm in a pentad ratio in a $^{13}$C- nuclear magnetic resonance method and a fusion peak temperature (Tm) of at least 150° C., preferably 150 to 167° C., and fusion enthalpy (ΔHm) of at most 100 J/g, preferably 25 to 83 mJ/mg, as determined by differential scanning calorimetry (DSC). Crystallinity may be estimated from Tm and ΔHm. If Tm and ΔHm are out of the aforesaid ranges, rubber elasticity at 100° C. or higher of the elastomer composition obtained is not improved.

It is preferred to use two types of peroxdie-decomposing type olefinic resins in combination as will be described below.

Peroxide-decomposing type olefinic resins to be blended before the crosslinking reaction are preferably high molecular weight propylene homopolymers such as isotactic polypropylenes, or copolymers of propylene with a smaller amount of other α-olefine such as ethylene, 1-butene, 1-hexene or 4-methyl-1-pentene. These resins preferably have an MFR (ASTM D-1238, Condition L, 230° C.) of 0.1 to 10 g/10 min., more preferably 3 to 8 g/10 min.

Peroxide-decomposing type olefinic resins to be blended after the crosslinking reaction are preferably one or more of highly flowable block or random propylene copolymers or homopolymers, such as isotactic polypropylenes or copolymers of propylene with a smaller amount of other α-olefine such as ethylene, 1-butene, 1-hexene or 4-methyl-1-pentene. These resins preferably have an MFR of 5 to 200 g/10 min., more preferably 8 to 150 g/10 min., particularly 10 to 100 g/10 min.

If the MFR of the peroxide-decomposing type olefinic resin to be blended before the crosslinking reaction is less than 0.1 g/10 min., moldability of the elastomer composition obtained is deteriorated. If it exceeds 10 g/10 min., rubber elasticity of the elastomer composition obtained is deteriorated.

If the MFR of the peroxide-decomposing type olefinic resin to be blended after the crosslinking reaction is less than 5 g/10 min., moldability of the elastomer composition obtained is deteriorated. If it exceeds 200 g/10 min., rubber elasticity of a composition obtained is deteriorated.

In addition to those described above, use may be made of a peroxide-decomposing type olefinic resin composed of boiling heptane-soluble polypropylene having a number average molecular weight (Mn) of at least 25,000 and a ratio of Mw to Mn, Mw/Mn, of at most 7 and boiling heptane-insoluble polypropylene having a melt index of 0.1 to 4 g/10 min. or a peroxide-decomposing type olefinic resin composed of boiling heptane-soluble polypropylene having an intrinsic viscosity [η] of at least 1.2 dl/g and boiling heptane-insoluble polypropylene having an intrinsic viscosity [η] of 0.5 to 9.0 dl/g.

According to the invention, at least a part of component (d), preferably at least 3 parts by weight of component (d), is subjected to the heat treatment in the presence of an organic peroxide, and the remaining part of component (d), preferably at least 5 parts by weight of (d), is blended after the heat treatment. All components are dispersed uniformly by such portionwise addition of component (d), so that stickiness on the surface of a molded article disappears and moldability is also improved.

It is preferred that the amount of component (d) to be blended before the crosslinking reaction (X) is less than that after the crosslinking reaction (Y), because the resin composition will have better rubber elasticity. The aforesaid X and Y may be determined depending upon a final molding process, such as injection molding or extrusion molding, in a specific case.

Second, component (d) in processes P-2 and P-3 and composition C-2 will be described. Component (d) of the invention again attains an effect of improving dispersion of the rubber in the composition obtained so as to improve appearance of a molded article. In addition, component (d) exhibits an effect of adjusting hardness and shrinkage. The component is an olefinic (co)polymer which is pyrolyzed by the heat treatment in the presence of peroxide to decrease its molecular weight and, therefore, its melting flowability increases. Examples of such include isotactic polypropylenes, and copolymers of propylene with other α-olefine such as ethylene, 1-butene, 1-hexene or 4-methyl-1-pentene.

A peroxide-decomposition type olefinic resin suitable as component (d) of the invention has Tm of 150 to 167° C. and ΔHm of 25 to 83 mJ/mg, as determined by DSC on its homopolymeric part. Crystallinity may be estimated from Tm and ΔHm. If Tm and ΔHm are out of the aforesaid ranges, rubber elasticity at 100° C. or higher of the elastomer composition obtained is not improved.

Component (d) has an MFR (ASTM D-1238, Condition L, 230° C.) of preferably 0.1 to 50 g/10 min., more preferably 0.5 to 20 g/10 min. If the MFR is less than 0.1 g/10 min., moldability of the elastomer composition obtained deteriorates. If it exceeds 50 g/10 min., rubber elasticity of the elastomer composition obtained deteriorates.

Component (d) is blended in an amount of at most 100 parts by weight, preferably at most 50 parts by weight, and at least 5 parts by weight, preferably at least 10 parts by weight, per 100 parts by weight of component (a). If the amount is less than the lower limit, moldability is deteriorated. If it exceeds the upper limit, the elastomer composition obtained is too hard and lacks softness, so that it is difficult to obtain an article with rubber-like touch.

Component (e), Polyester Type (Co)Polymer, Polyamide Type (Co)Polymer or Polyurethane Type (Co)Polymer The polyester type (co)polymer, polyamide type (co)polymer or polyurethane type (co)polymer is not restricted to particular one and any polymer and copolymer may be used satisfactorily. The copolymers may be a block or graft copolymer. The (co)polymers are preferred to have elastomeric properties. Commercially available polymers may be used satisfactorily. The aforesaid copolymers are particularly preferred. The aforesaid (co)polymers may be used alone or in a combination. Examples of the polyester type (co)polymer include (co)polymers in which a hard component is an aromatic polyester and a soft component is an aliphatic polyether, or in which a hard component is an aromatic polyester and a soft component is an aliphatic polyester, or in which a hard component is polybutylene naphthalate and a soft component is an aliphatic polyether. Examples of the polyamide type (co)polymer include nylon-6, nylon-6,6, nylon-4,6, nylon-6,10, nylon-6,12, and block elastomers in which a hard component is polyamide (nylon-6 type or nylon-12 type polyamide is used as polyamide) and a soft component is polyetherester, or a hard component is polyamide and soft component is polyetherester. Examples of the polyurethane type (co)polymer include lactone type, ester type or ether type (co)polymers.

Component (e) is blended in an amount of 1.0 to 1,200 parts by weight, preferably 100 to 500 parts by weight, per 100 parts by weight of component (a). If the amount is more than 1,200 parts by weight, softness of the elastomer composition obtained is decreased to be little different from that of polyester type (co)polymer, polyamide type (co)polymer or polyurethane type (co)polymer.

In the present invention, the addition of component (e) makes the elastomer composition extremely improved in oil resistance and stain resistance.

Component (f), Hydrogenated Petroleum Resin

A hydrogenated petroleum resin may be blended in the invention, if needed. When the hydrogenated petroleum resin is blended, there may be obtained such effects of balancing softness and stickiness. That is, softness is attained without stickiness. Examples of the hydrogenated petroleum resin include hydrogenated aliphatic petroleum resins, hydrogenated aromatic petroleum resins, hydrogenated copolymer petroleum resins, hydrogenated alicyclic petroleum resins and hydrogenated terpene resins.

The hydrognated petroleum resins may be obtained by hydrogenating, in a conventional manner, petroleum resins produced in conventional processes.

The petroleum resin used herein refers to resineous substances obtained in various processes in the refining industry and the petrochemical industry, or resins obtained by copolymerizing unsaturated hydrocarbons recovered from such processes, particularly from a naphtha cracking process, for instance, aromatic petroleum resins composed mainly of a $C_5$ fraction, aromatic petroleum resins composed mainly of a $C_9$ fraction, copolymeric petroleum resins from those, and alicyclic petroleum resins.

A preferred hydrogenated petroleum resin is a hydrogenated alicyclic petroleum resin, particularly, such obtained by copolymerizing cyclopentadiene type compounds with vinyl aromatic compounds and hydrogenating the copolymer obtained.

The hydrogenated petroleum resin used in the invention is preferably one which is completely hydrogenated. Partially hydrogenated ones tend to give worse stability and resistance to weathering.

The hydrogenated petroleum resin is blended in an amount of 100 parts by weight or less, per 100 parts by weight of component (a). Even if the amount exceeds 100 parts by weight, a further softening effect on the composition obtained is little and, rather, an action of the petroleum resin as a tackifier becomes conspicuous and mechanical properties become worse as well. If a non-hydrogenated petroleum resin is used, heat stability of the composition obtained is bad, so that the purpose of the invention is not attained.

Component (g), Inorganic Filler

Inorganic fillers may be blended, if needed. The fillers improve some physical properties, such as a permanent compressive strain of a molded article, and further offer an economical advantage as an extender. Any conventional inorganic fillers may be used, such as calcium carbonate, talc, magnesium hydroxide, mica, clay, barium sulfate, natural silica, synthetic silica (white carbon), titanium oxide, and carbon black. Among those, calcium carbonate and talc are particularly preferred.

The inorganic filler may be blended in an mount of 0 to 100 parts by No. 5-75016/1993 (i.e., Laid Open No. 1-230660/1989) discloses weight, preferably 0 to 60 parts by weight, per 100 parts by weight of component (a). If the amount exceeds 100 parts by weight, mechanical strength of an elastomer composition obtained is very low and, further, its hardness is so high that its flexibility is lost and an article with rubber-like touch cannot be obtained.

Component (h), Organic peroxide

An organic peroxide decomposes component (d) to increase flowability of the composition during melt kneading and, therefore, makes dispersion of a rubber component good. At the same time, it generates radicals which chain react to crosslink component (a). In addition, it accelerates the crosslinking of component (a) by optional component (c). Examples of the organic peroxides used in the invention include dicumyl peroxide, di-tert.-butyl peroxide, 2,5-dimethyl-2,5-di(tert.-butylperoxy) hexane, 2,5-dimethyl-2, 5-di(tert.-butylperoxy) hexine-3, 1,3-bis(tert.-butylperoxyisopropyl) benzene, 1,1-bis(tert.-butylperoxy)-3,3,5-trimethylcyclohexane, n-butyl4,4,-bis(tert.-butylperoxy)valerate, benzoylperoxide, p-chlorobenzoyl peroxide, 2,4-dichlorobenzoyl peroxide, tert.-butylperoxy benzoate, tert.-butylperoxyisopropyl carbonate, diacetyl peroxide, lauroyl peroxide, and tert.-butylcumyl peroxide.

Among those, most preferred are 2,5-dimethyl-2,5-di (tert.-butylperoxy)hexane, 2,5-dimethyl-2,5-di(tert.-butylperoxy) hexine-3 and 1,3-bis(tert.-butylperoxyisopropyl)benzene in terms of smell, coloring and scorch stability.

In the process P-1 and the composition C-1, the amount of the peroxide added is preferably 0.1 to 3 parts by weight, more preferably 0.5 to 2.5 parts by weight, particularly 0.8 to 2.5 parts by weight, per total 100 parts by weight of components (a) to (g) present at the time of addition of the peroxide. If the amount is less than 0.1 parts by weight, it tends not to attain the required crosslinking, while if the amount exceeds 3.0 parts by weight, it tends to proceed with the crosslinking too much to deteriorate the dispersion of the crosslinked materials.

In the processes P-2 and P-3 and the composition C-2, the amount of component (h) added is determined with consideration of the amounts of the aforesaid components (a) to (d) and component (k) described hereinafter and, particularly, the quality of the thermoplastic elastomer obtained. It is blended preferably in an amount of at most 3.5 parts by weight, particularly at most 2.0 parts by weight, and preferably at least 0.1 part by weight, per total 100 parts by weight of components (a) to (d) and (k). If the amount is more than the upper limit, the moldability becomes worse, while it is less than the lower limit, it tends not to attain sufficient crosslinking and, therefore, the heat resistance and mechanical strength of the elastomer obtained becomes worse.

Component (i), Crosslinking Aid

In the partial crosslinking treatment in the presence of the organic peroxide in the processes for the preparation of a thermoplastic elastomer composition according to the invention, a crosslinking aid may be blended. Examples of the crosslinking aid include polyvalent vinyl monomers such as divinylbenzene, triallylcyanurate, vinyl butylate and vinyl stearate and polyvalnet methacrylate monomers such as ethyleneglycol dimethacrylate, diethyleneglycol dimethacrylate, triethylenglycol dimethacrylate, polyethylenglycol dimethacrylate, trimethylolpropane trimethacrylate and allyl methacrylate, and dially esters of orthophthalic acid, isophthalic acid or terephthalic acid. These compounds will cause the crosslinking reaction more uniformly and more efficiently.

In the process P-1 and the composition C-1, a combination of triethylenegloycol dimethacrylate and diallyl phthalate is most preferred, because this combination is easy to handle and attains a well compatibility of a main component to be treated, peroxide-crosslinking type olefinic polymer rubber (c) with component (e), polyester type copolymer, and this has a solubilizing action for the peroxide to act as a dispersion aid for the peroxide, so that the crosslinking action in the heat treatment is uniform and efficient to give a cross-linked thermoplastic elastomer with a good balance between hardness and rubber elasticity.

The amount of the crosslinking aid used in the present process P-1 and the composition C-1 is preferably 0.1 to 10 parts by weight, more preferably 1 to 8 parts by weight, particularly 2 to 6 parts by weight, per total 100 parts by weight of components (a) to (f) present at the time of the addition of the crosslinking aid. It is preferred that the amount of the crosslinking aid added is about 2 to 2.5 times as large as the amount of the peroxide added. If the amount is less than 0.1 part by weight, it tends not to attain the crosslinking needed, while if it exceeds 10 parts by weight, it tends to decrease the crosslinking effect.

In the processes P-2 and P-3 and the composition C-2, triethylengloycol dimethacrylate is most preferred. This compound is easy to handle and well compatible with main components to be treated, components (a), and (c), and this has a solubilizing action for the peroxide to act as a dispersion aid for the peroxide, so that the crosslinking action in the heat treatment is uniform and efficient to give a cross-linked thermoplastic elastomer with a good balance between hardness and rubber elasticity.

In the processes P-2 and P-3 and the composition C-2, the amount of the crosslinking aid blended is determined with consideration of the amounts of the aforesaid components (a) to (d) and component (k) described hereinafter and the quality of the thermoplastic elastomer obtained. It is blended preferably in an amount of at most 3.5 parts by weight, particularly at most 2.5 parts by weight, and preferably at least 0.1 part by weight, per total 100 parts by weight of components (a) to (d) and (k). If the amount is more than the upper limit, a degree of crosslinking tends to decrease because of self polymerization, while it is less than the lower limit, it tends not to attain the effect of this material sufficiently.

Component (j), Antioxidant

Antioxidant may also be added, if needed, such as phenolic antioxidant such as 2,6-di-tert.-butyl-p-cresol, 2,6-di-tert.-butylphenol, 2,4-di-methyl6-tert.-butylphenol, 4,4-dihydroxydiphenyl, and tris(2-methyl-4-hydroxy-5-tert.-butylphenyl)butane, phosphite type antioxidants and thioether type antioxidants. Among those, the phenolic antioxidants and the phosphite type antioxidants are preferred.

In the processes P-1 and the composition C-1, the amount of the antioxidant is preferably 3 parts by weight or less, more preferably 1 part by weight or less, per total 100 parts by weight of components (a) to (f) present at the time of the addition of the antioxidant. It is preferred to add the antioxidant in the first step of the preparation process so as to prevent hydrolysis of the polyester type thermoplastic elastomer such as TPEE.

In the processes P-2 and P-3 and the composition C-2, the amount of the antioxidant is preferably 3 parts by weight or less, more preferably 1 part by weight or less, per total 100 parts by weight of components (a) to (d) and component (k) described below.

Component (k), Liquid Polybutadiene

Liquid polybutadiene is a polymer in which microstructure of a main chain is composed of vinyl 1,2-bonding, trans 1,4-bonding and cis 1,4-bonding and which is transparent liquid in room temperature. The vinyl 1,2-bonding amounts to preferably 30% by weight or less. If the vinyl 1,2-bonding exceeds 30% by weight, the properties of the composition obtained tends to deteriorate.

A number average molecular weight of the liquid polybutadiene is preferably at most 5,000, more preferably at most 4,000, and preferably at least 1,000, more preferably at least 3,000. If the number average molecular weight is below 1,000, the heat deformation resistance of the composition obtained tends to become worse, while if it exceeds 5,000, the compatibility of the composition obtained tends to become worse.

The liquid polybutadiene is preferably a copolymerizable compound having one or more groups selected from epoxy, hydroxyl, isocianate and carboxyl groups. Among these, one having a hydroxyl group and a copolymerizable unsaturated double bond is particularly preferred. Commercially available liquid polybutadiene includes, for example, R-45HT, trade mark, ex Idemitsu Petrochemical Co.

Component (k) is blended in an amount of at most 30 parts by weight, preferably at most 10 parts by weight, and at least 1 part by weight, preferably at least 3 parts by weight, per 100 parts by weight of component (a). If the amount is below the lower limit, effects of the addition is not observed, while if it exceeds the upper limit, the mechanical properties of the composition is deteriorated.

Component (l), Unsaturated Glycidyl Compound or Derivative Thereof

An unsaturated glycidyl compound or derivative thereof is used as a modifier. As the unsaturated glycidyl compound or derivative thereof, use may be made preferably of glycidyl compounds having an unsaturated group which may copolymerize with olefin and a glycidyl group in the molecule, more preferably, glycidyl methacrylate. Preferably, polyethylene and polypropylene are modified by this modifier. That is, a soft component of component (a), hydrogenated block copolymer, component (c), peroxide-crosslinking type olefinic resin and/or a copolymeric rubber and component (d), peroxide-decomposing type olefinic resin and/or a copolymeric rubber containing said resin, are modified.

Component (l) is blended in an amount of at most 15 parts by weight, preferably at most 10 parts by weight, and at least 0.01 part by weight, preferably at least 0.1 part by weight, more preferably at least 3 parts by weight, per 100 parts by weight of component (a). If the amount exceeds the upper limit, heat deformation resistance and mechanical properties of the composition are deteriorated and, in addition, the effect of improving compatibility of component (n), if blended, is not observed.

Component (m), Unsaturated Carboxylic Acid or Derivative Thereof

An unsaturated carboxylic acid or derivative thereof is used as a modifier. Preferably, examples of the unsaturated carboxylic acid or derivative thereof include acrylic acid, methacrylic acid, maleic acid, dicarboxylic acid or derivatives thereof such as acids, halides, amides, imides, anhydrides or esters. Particularly, maleic anhydride (MAH) is preferably used. Preferably, polypropylene is modified by this modifier. That is, it is considered that a soft component of component (a), hydrogenated block copolymer, and component (d), peroxide-decomposing type olefinic resin and/or a copolymeric rubber containing said resin, are modified.

Component (m) is blended in an amount of at most 15 parts by weight, preferably at most 10 parts by weight, and at least 0.01 part by weight, preferably at least 0.1 part by weight, more preferably at least 5 parts by weight, per 100 parts by weight of component (a). If the amount exceeds the upper limit, conspicuous yellowing occurs in the composition and heat deformation resistance and mechanical properties of the composition deteriorate and, in addition, the effect of improving compatibility of component (n), if blended, is not observed.

Component (n), Polyester (co)polymer, Polyurethane (co)polymer, Polyamide (co)polymer and Polymethylpentene (co)polymer A polyester (co)polymer, polyurethane (co)polymer, polyamide (co)polymer or polymethylpentene (co)polymer is not restricted to particular one and any (co)polymers may be used satisfactorily. Preferably, block copolymer or graft copolymer is used. It preferably has elastomeric properties. As this component, commercially available products may be used.

The aforesaid (co)polymers may be used alone or as a combination of them. Examples of the polyester (co) polymer include (co)polymers in which a hard component is an aromatic polyester and a soft component is an aliphatic polyether, or in which a hard component is an aromatic polyester and a soft component is an aliphatic polyester, or in which a hard component is polybutylene naphthalate and a soft component is an aliphatic polyether. Examples of the polyamide (co)polymer include nylon-6, nylon-6,6, nylon-4,6, nylon-6,10, nylon6,12, or block elastomers in which a hard component is polyamide (nylon-6 type or nylon-12 type polyamide is used as polyamide) and a soft component is polyetherester. Examples of the polyurethane (co)polymer include lactone type, ester type or ether type (co)polymers. Examples of the polymethylpentene (co)polymer include poly-4-methylpentene-1.

Component (n) is blended in an amount of at most 1,500 parts by weight, preferably at most 1,200 parts by weight, and at least 20 parts by weight, preferably at least 100 parts by weight, per 100 parts by weight of component (a). If the amount exceeds the upper limit, softness of the elastomer composition obtained is decreased, which becomes to be little different from that of polyester (co)polymer, polyamide (co)polymer, polyurethane (co)polymer or polymethylpentene(co)polymer. The addition of component (n) may extremely improve the oil resistance, abrasion resistance and properties at a high temperature such as tensile properties at a high temperature of the elastomer composition obtained.

It is possible for the compositions according to the invention to contain various additives such as anti-blocking agents, sealing property-improving agents, heat stabilizers, UV absorbers, lubricants, nucleating agents and colorants in addition to the aforesaid components, depending on the applications.

The process P-1 will be described below.

The heat processing in the presence of an organic peroxide and the blending in the process for the preparation of the resin composition according to the invention may be carried out by any conventional means. The process of the invention may be carried out, for instance, in the following three steps.

In a first step, component (a), component (b), at least a part of component (c), at least a part of component (d) and at least a part of component (e) are melt and kneaded, optionally together with component (f), optional additives such as an antioxidant, a light stabilizer, a colorant and a flame retardant, and component (g).

Any conventional means for kneading rubbers or plastics may be used satisfactorily, such as single screw extruders, twin screws extruders, rolls, Banbury mixers, and various kneaders. In this step, a composition is obtained in which all of those components are dispersed uniformly.

In a second step, a peroxide and, if desired, a crosslinking aid are added to the composition obtained in the first step, and further kneaded under heating to cause crosslinking. Particularly good properties are attained in this way, i.e., by previously melt kneading components (a) to (g) to have microdispersion and then adding an organic peroxide to cause crosslinking. This step may be carried out, for instance, by twin screws extruders or Banbury mixers.

The aforesaid first and second steps may be joined in a single step where the components are mixed and melt kneaded.

In a third step, the remaining part of component (c) and the remaining part of component (d) and the remaining part of component (e), if any, are added and kneaded. The kneading may be carried out, for instance, by single screw extruders, twin screws extruders, rolls, Banbury mixers, or various kneaders. In this step, dispersion of each component proceeds further and, at the same time, the reaction is completed.

A twin screws extruder with a L/D ratio of 47 or more or a Banbury mixer is preferred as a kneading means, because all of the steps may be carried out continuously. For instance, when a twin screws extruder is operated at a screw rotation speed of 80 to 250 rpm, preferably 80 to 100 rpm, each component is dispersed well to give good properties.

A kneading temperature in the first step is preferably set so that each component melts completely to be easily mixed. A kneading temperature in the second step is preferably chosen so that a sufficient shearing force acts on the organic peroxide and the other components and, further, the reaction proceeds uniformly. In the third step, the temperature is desirably set so that the mixing of all of the components proceeds further and the reaction is completed.

Component (a) shall be added in the first step or, at the latest, in the second step, whereby a part of component (a) causes a crosslinking reaction to better the dispersion of each components.

Component (b) and component (f) is preferably blended in the first step. If they are blended in the third step, it will be a cause for bleed-out, stickiness or deterioration in properties.

Component (c) may be blended all in the first step. However, a proper amount of it may be blended in the first step and the remaining part of it may be blended in the second or third step to adjust the processability, flowability and mechanical strength. This is preferred when component (e) is blended in the third step, because the composition partially crosslinked in the presence of the peroxide is compatible with a part of component (c) added in the second or third step and comes into microdispersion, so that physical properties of the elastomer composition obtained, such as mechanical strength, are improved. In the case where component (e) is not blended in the third step, it is preferred that a proper amount of component (c) is blended in the first step.

As mentioned above, a proper part of component (d) is blended in the first step and the remaining part is blended in the third step, whereby the remaining part of component (d) added in the third step is compatible with the composition which was partially cross-linked in the presence of a peroxide and comes into microdispersion, so that physical properties of the elastomer composition obtained, such as moldability, flowability and mechanical strength, are improved. The inorganic filler may be blended in either or both of the first step and the third step.

A degree of the crosslinking of the thermoplastic elastomer composition thus obtained is represented by a gel ratio and a dynamic elasticity. The gel ratio is determined as follows: 1 g of a sample is wrapped with a 100 mesh wire netting and extracted in boiling xylene in a Soxhlet extractor for 10 hours. A ratio of the weight of the remaining solid to the weight of the sample is the gel ratio. The dynamic elasticity is represented by a storage modulus of melt viscoelasticity determined by parallel plates.

The degree of the crosslinking is preferably such represented by a gel ratio of 30 to 45% by weight, more preferably 35 to 45% by weight, and a storage modulus of $10^5$ to $10^7$ Pa. Below these ranges, the compression set and oil resistance of the thermoplastic elastomer composition obtained are bad. Above these ranges, softness is lost and moldability and processability are bad, and also, tensile properties are deteriorated.

Each component is micro-dispersed more uniformly in the thermoplastic elastomer composition thus obtained, compared to compositions of the prior art. Accordingly, compression set, tensile strength and other physical properties are steadily attained.

The processes P-2 and P-3 will be described below.

The process for the preparation of the resin composition according to the invention comprises the following steps:

(I) melt kneading, in advance, the whole amounts of components (a), (b), (k), (l) and (m) and component (c), if used, and a part of component (d), and at the same time or subsequently, melt kneading these with the whole of component (h), and (II) melt kneading the product obtained from step (I) with the remaining part of component (d).

In this process, component (d) is melt kneaded partially in step (I) and partially in step (II). The ratio of component (d) blended in step (I) to that in step (II) is preferably 10:90 to 90:10 in weight ratio. If the amount of (d) melt kneaded in step (I) is too much, a large part of (d) is decomposed by the molecule-cutting action of an organic peroxide, so that flowability of the composition is considerably decreased and, therefore, uniform dispersion of each component may not be obtained, and deterioration in physical properties such as tensile properties and surface peeling occur in the composition obtained. Meanwhile, the amount of (d) melt kneaded in step (I) is too little, flowability of the composition is not improved during the melt kneading. Particularly, dispersion of (a) is deteriorated and, therefore, the crosslinking cannot be carried out in a good dispersing state, so that deterioration in physical properties such as tensile properties and surface peeling occur in the composition obtained.

If the aforesaid component (i), crosslinking aid, is used, it is melt kneaded together with component (h), organic peroxide, in step (I), whereby the effects of component (i) may be attained.

A preferred embodiment of the present process will be described below. For example, the whole amounts of components (a), (b), (k), (l) and (m) and component (c), if used, and a part of component (d) are melt kneaded, together with optional additives such as an antioxidant, a light stabilizer, a pigment and a flame retardant. The means for melt kneading are not restricted to particular ones and any conventional means may be used, such as single screw extruders, twin screws extruders, rolls, Banbury mixers, and various kneaders. A melt kneading temperature is preferably 160 to 180° C. Next, component (h) and preferably component (i) are added to the product obtained by this melt kneading and melt kneaded together, whereby partial crosslinking of component (a) by components (d) and (c) may be attained. The melt kneading may be carried out generally on, for example, twin screws extruders or Banbury mixers. Subsequently, the remaining part of component (d) is further added to the product obtained by this melt kneading and melt kneaded. A melt kneading temperature for crosslinking is preferably 180 to 240° C., more preferably 180 to 220° C. This melt kneading may be carried out using, for example, single screw extruders, twin screws extruders, rolls, Banbury mixers, and various kneaders. For example, when a twin screws extruder with an L/D ratio of 47 or more or a Banbury mixer is used, it is possible to carry out the aforesaid process continuously.

In the case where component (n) is blended and melt kneaded, the elastomer composition according to the invention may be prepared in the following process.

That is, the process comprises the following steps:
(I) melt kneading, in advance, the whole amounts of components (a), (b), (d), (k), (l) and (m) and, if used, component (c) or the whole amounts of components (a), (b), (d), (k), (l) and (m) and, if used, component (c) and the whole or a part of component (n) and, at the same time or subsequently, melt kneading these with the whole of (h), and
(II) further melt kneading the product obtained from the step (I) with the remaining part of component (n), if any.

For materials used as component (n), those having a melting point much higher than that of a matrix resin, such as nylon-6 and polymethylpentene may be blended and melt kneaded all in step (I), or the whole of them may be blended and melt kneaded in step (II), or they may be blended and melt kneaded partly in step (I) and partly in step (II) in a proper ratio. Such materials are preferably melt kneaded for a long time in order to disperse them uniformly in a matrix resin. In addition, such materials are decomposed with difficulty, and therefore, give no deterioration in properties of the resin composition as a result of the decomposition in step (I). Accordingly, it is preferred to blend and melt knead these materials in step (I) and to disperse them uniformly in the matrix resin. In the case where they are blended in step (II), it is preferred that these materials are sufficiently melted at a high temperature in advance and then side fed and kneaded.

For materials used as component (n), those having a relatively low melting point, such as thermoplastic polyester type (co)polymers, thermoplastic polyamide type (co) polymers or thermoplastic polyurethane type (co)polymers, are preferrably blended and melt kneaded separetely in steps (I) and (II), with a ratio of the weight in step (I) to the weight in (II) being 10:90 to 0:100. Particularly preferred is a process in which none of them is blended in step (I) and the whole of them is blended and melt kneaded in step (II). If the amount of them blended in step (I) exceeds the upper limit, the decomposition of them may results in deterioration in physical properties of the elastomer composition obtained in some cases.

In the case where component (i), crosslinking aid, is used, component (i) is blended and melt kneaded in step (I) together with component (h), organic peroxide.

An embodiment of the present process will be described below. For example, the whole amounts of components (a), (b), (d), (k), (l) and (m) and, if used, component (c) are blended optionally with a part of component (n), and an antioxidant, a light stabilizer, a pigment and a flame retardant, if desired, and melt kneaded. Means for melt kneading are not restricted to particular ones and any conventional means may be used, such as single screw extruders, twin screws extruders, rolls, Banbury mixers, and various kneaders. A melt kneading temperature is preferably 160 to 220° C. To the product obtained by the melt kneading are then added and melt kneaded component (h) and preferably component (i), whereby the crosslinking of component (a) by component (d) and component (c), if any, may be attained. The melt kneading is carried out on, for example, a twin screws extruder or a Banbury mixer. Subsequently, the remaining part of component (n) is further added to the product obtained by the melt kneading, followed by melt kneading. A melt kneading temperature is preferably 180 to 240° C., particularly 180 to 220° C. This melt kneading may be carried out using, for example, single screw extruders, twin screws extruders, rolls, Banbury mixers, and various kneaders. For example, when a twin screws extruder with an L/D ratio of 47 or more or a Banbury mixer is used, it is possible to carry out the aforesaid process continuously. The melt kneading in a latter stage corresponding to step (II) may also be carried out, for example, immediately before an injection molding.

A degree of the crosslinking of the thermoplastic elastomer composition thus obtained is represented by a gel ratio and a storage modulus. The gel ratio is determined as mentioned above. The storage modulus is determined in a terminal low frequency region of $10^{-2}$ Hz in melt viscoelasticity determined by parallel plates. The gel ratio is preferably 25 to 40% by weight, more preferably 25 to 35% by weight, and the storage modulus is preferably $10^4$ to $10^8$ Pa, more preferably $10^5$ to $10^7$ Pa. Below these ranges, the compression set and oil resistance of the thermoplastic elastomer composition obtained are bad. Above these ranges, softness is lost and moldability and processability are bad, and also, tensile properties are deteriorated.

The thermoplastic elastomeric resin compositions, C-1 and C-2, are soft and excellent in heat deformation resistance and moldability and processability, particularly in oil resistance, abrasion resistance and mechanical properties at a high temperature. Accordingly, they may be used for electrical wires, electric parts, industrial mechanical parts, medical apparatus, parts in the food fields, auto mobile parts and building materials. The electrical wires and electric parts include, for example, connectors, switch covers, plugs, gaskets, grommets, cable jacket curl cords?, electric wire insulation. The industrial mechanical parts include, for example, pressure proof hoses, diaphragms, gaskets, packings, casters, grommets, roller coupling grips, hoses. The medical apparatus and parts in food fields include syringe chips, medicine vessel closures, grommets, blood-gathering tube caps, cap seals. The auto mobile parts include, for example, rack and pinion boots, shock absorber dust boots, vacuum connectors, air ducts, tubes, run channels, grommets, handle covers, air bag outer cover steerings, mad guards, radiator hoses and brak hoses. The building materials include, for example, window frame seals, expansion joints, sponge seals, handrail coverings and non-slip materials for steps. Other applications includes, for example, grip materials such as pen grips, bicycle grips, tooth brash grips, parts for toys, mats, goggle, dust masks or gas masks and shoe bottoms.

The composition comprising components (a), (b), (c), and (d) may be melt bonded to various resins such as polyvinyl chloride, polysulfone, polyphenylene ether, ABS, polymethyl methacrylate, polycarbonate, polyolefin and polyamide.

EXAMPLES

The present invention is further elucidated with reference to the following Examples and Comparison Examples, which is not intended to limit the invention. The values in the Tables are represented in part by weight, unless otherwise indicated. The evaluation methods used were as follows:

1) Hardness: determined in accordance with the Japanese Industrial Standards (JIS) K 6301 and JIS S 6050 in Examples 1 to 10 and Comparison Examples 1 to 12, and JIS K 7215 in Examples 11 to 23 and Comparison Examples 13 to 66. Pressed sheets having a thickness of 6.3 mm were used as test pieces.
2) Tensile strength: determined in accordance with JIS K 6301 using a test piece which was obtained by punching out a pressed sheet having a thickness of 1 mm by a No. 3 dumbbell die. The tensile speed was 500 mm/min. In Examples 1 to 10 and Comparison Examples 1 to 12, the test temperature was room temperature. In Examples 11 to 23 and Comparison Examples 13 to 66, the test temperature was room temperature, 120° C. or 150° C.

3) Tensile elongation: determined in accordance with JIS K 6301 using a test piece which was obtained by punching out a pressed sheet having a thickness of 1 mm by a No. 3 dumbbell die. The tensile speed was 500 mm/min.

4) Stress at 100% elongation: determined in accordance with JIS K 6301 using a test piece which was obtained by punching out a pressed sheet having a thickness of 1 mm by a No. 3 dumbbell die. The tensile speed was 500 mm/min.

5) Impact resilience: determined in accordance with BS903 using a pressed sheet having a thickness of 4 mm as a test piece.

6) Compression set: determined in accordance with JIS K 6262 using a pressed sheet having a thickness of 6.3 mm as a test piece. Conditions: 25% deformation at 125° C.×72 hrs. or 150° C.×22 hrs. in Examples 1 to 10 and Comparison Examples 1 to 12 and at 120° C.×72 hrs. in Examples 11 to 23 and Comparison Examples 13 to 66.

7) Tearing strength: determined in accordance with JIS K 6301 using a test piece which was obtained by punching out a pressed sheet having a thickness of 2.5 mm by a B type dumbbell die. The tensile speed was 500 mm/min.

8) Oil resistance: determined in accordance with JIS K 6301 using a test piece which was obtained by punching out a pressed sheet having a thickness of 1 mm by a No. 3 dumbbell die. ASTM No. 2 oil was used. In Examples 1 to 10 and Comparison Examples 1 to 12, weight change was measured after dipping at 120° C.×72 hrs. or after dipping at 30° C.×168 hrs. In Examples 11 to 23 and Comparison Examples 13 to 66, weight change and volume change were measured after dipping at 120° C.×70 hrs.

9) Stain resistance: determined in accordance with JIS K 6902 using a pressed sheet having a thickness of 1 mm as a test piece. Test pieces were stained by a shoe polish, left at 23° C. for 24 hrs. and washed with water. Discoloration was observed visually.

10) Moldability in Examples 1 to 10 and Comparison Examples 1 to 12: determined by molding a composition into a sheet of 8.5×5×3 mm on an 80 tons injection molding machine. When neither delamination nor deformation was observed and there was no flow mark which extremely deteriorated appearance, moldability was evaluated as good.

11) Stickiness: evaluated as good when, on the molded sheet mentioned in (10) immediately above, neither bleeding nor blooming of low molecular weight substances was observed and no stickiness was felt in touch by fingers.

12) Taber abrasion: determined in accordance with JIS K 7204 using a 2 mm thick pressed sheet. Weight loss by abrasion was determined after 1,000 turns with a truck wheel, H-22.

13) Moldability in Examples 11 to 23 and Comparison Examples 13 to 66: a composition was molded into a sheet of 12.5 mm×13.5 mm×1 mm by a 120 tons injection molding machine in the following conditions:

molding temperature: 220° C.,
mold temperature: 40° C.,
injection speed: 55 mm/sec.,
injection pressure: 1400 kg/cm$^2$,
holding pressure: 400 kg/cm$^2$,
injection time: 6 seconds,
cooling time: 45 seconds.

It was observed whether delamination, surface peeling, deformation or flow marks which extremely deteriorated appearance was present or not.
○: good
Δ: slightly bad
X: bad 14) Bleed-out property: The molded sheet mentioned in (13) immediately above, was compressed by 50% under the condition of 100° C.×22 hrs. It was observed whether bleeding or blooming of low molecular weight substances was visually observed or not, and whether stickiness was felt or not in tough by fingers.
○: good
Δ: slightly bad
X: bad 15) Evaluation tests for adhesive property were carried out as follows:

The test method will be explained by reference to FIGS. 1 to 3. The following various resins were molded into sheet 3 of 150×25×4 mm on a 120 tons injection molding machine in the following conditions:

molding machine: FS-120, ex Nissei Resin Industries Inc.,
molding temperature: 200° C. or 250° C., depending upon a recommended temperature for each resin,
mold temperature: 40 to 150° C.,
injection speed: 55 mm/sec.,
injection pressure: 1400 kg/cm$^2$,
holding pressure: 400 kg/cm$^2$,
injection time: 6 seconds,
cooling time: 45 seconds.

Resins used:
Vinyl chloride, VDV0030A, trade mark, ex Riken Vinyl Industries Inc.,
Polysulfone, Udel P-1700, trade mark, ex Teijin-Acomo Co.,
Modified polyphenylene ether, Xyron X9102, trade mark, ex Asahi Kasei Industries Inc.,
ABS, JSR ABS38, trade mark, ex Japan Synthetic Rubber Co.,
Polystyrene, Styron G8073, trade mark, ex Asahi Kasei Industries Inc.,
Polymethyl methacrylate, Derpet SR8200, trade mark, ex Asahi Kasei Industries Inc.,
Polycarbonate, Jupilon S-3000, trade mark, Mitsubishi Gas Chemical Co.,
High density polyethylene, 110J, trade mark, ex Idemitsu Petrochemical Co.,
Polypropylene, RB110, trade mark, ex Tokuyama Co.,
Nylon, nylon-6, A1025, trade mark, ex Unitika Co.

Figure 2:
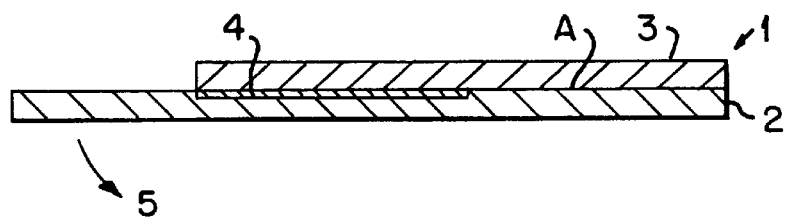
FIG. 2 is a front view of a test piece before being bent for evaluation of adhesive property.
Figure 3:
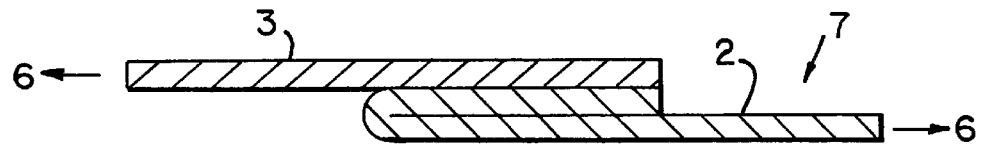
FIG. 3 is a front view of a final test piece after being bent for evaluation of adhesive property.

A piece of paper, 4, of 75×25 mm was bonded to sheet 3 of the aforesaid resin as indicated in FIGS. 1 and 2 wherein the sizes are in millimeter. It was then inserted in a predetermined mold. Next, each resin composition from the Examples and Comparison Examples was injection molded at a molding temperature of 220° C. (the other conditions were same as mentioned above) to obtain bonded sheet 1, i.e., a test piece before bended, wherein sheet 2 of 3 mm thickness and sheet 3 of 4 mm thickness were welded on the surface A as indicated in FIGS. 1 and 2. In the Figures, sheet 2 is a sheet composed of each resin composition from the Examples and Comparison Examples. Sheet 2 was then bended at 180 degrees in the direction indicated by arrow 5 to make test piece 7 as indicated in FIG. 3. Subsequently, the test piece was drawn at a tensile speed of 50 mm/min. in the direction indicated by arrow 6 to determine the adhesive strength using a load cell.

Materials used:

Component (a): hydrogenated block copolymer, Septon 4077, ex. Kuraray Co.,
  styrene content: 30% by weight,
  isoprene content: 70% by weight,
  number average molecular weight: 260,000,
  weight average molecular weight: 320,000,
  molecular weight distribution: 1.23, and
  hydrogenation ratio: at least 90%.

Component (b): non-aromatic softening agent for rubber, Diana Process Oil, PW-90, ex Idemitsu Kosan Co.,
  type: paraffin type oil,
  weight average molecular weight: 540,
  content of aromatic components: not more than 0.1%,
  paraffinic carbon content: 71%, and
  naphthenic carbon content: 29%.

Component (c): peroxide-crosslinking type olefinic resin
  PE-1; BondFast BF-E, ex Sumitomo Chemical Co.,
    type: epoxy group-containing ethylene copolymer
    MFR: 3 g/10 min.
  PE-2; BondFast 7L, ex Sumitomo Chemical Co.,
    type: epoxy group-containing ethylene copolymer,
    MFR: 3 g/10 min.
  These were used in Examples 1 to 13 and Comparison Examples 1 to 12.
  HE; ethylene-hexene copolymer, SP2520, trade mark, ex Mitsui Petrochemical Industries Inc.,
    density: 0.928 g/cm3,
    melt index, determined at 190° C. and a load of 2.16 kg: 1.7 g/10 min., used in Examples 11 to 23 and Comparison Examples 13 to 66.

Component (d): peroxide-decomposing type olefinic resin
  PP-1; CJ700, ex Mitsui Petrochemical Industries Inc.,
    type: polypropylene (PP)
    MFR: 7 g/10 min.,
    crystallinity: Tm 166° C., Δ Hm 82 J/mg,
    used in the first step in Examples 1 to 5 and Comparison Examples 1 and 2 and in Examples 11 to 23 and Comparison Examples 13 to 66.
  PP-2; TPO E2640, ex Idemitsu Petrochemical Inc.,
    type: low crystalline polypropylene
    MFR: 2.5 g/10 min.,
    used in the first step in Examples 6 to 10 and Comparison Examples 3 to 12.
  PP-3; BC03B, Mitsubishi Yuka Inc.,
    type: polypropylene (PP)
    MFR: 30 g/10 min.,
    used in the third step in Examples 1 to 10 and Comparison Examples 1 to 7 and 9 to 12.

Component (e): polyester type elastomer, polyamide type elastomer or polyurethane type elastomer
  TPEE-1; 4047, ex Toray-Du Pont Inc.,
    type: polyester type elastomer
  TPAE-1; 2533SA01, ex ATOCHEM Inc.,
    type: polyamide type elastomer
  TPUE-1: E190, Nippon Mirakutoran Inc.,
    type: polyurethane type elastomer Component (f): hydrogenated petroleum resin,
  Imarv P-140, ex Idemitsu Petrochemical Inc.,
    type: hydrogenated petroleum resin, C5- aromatic type copolymeric hydrogenated resin Component (g): inorganic filler
  RS400, ex Sankyo Seihun Co.,
    type: calcium carbonate Component (h): organic peroxide
  Perkadox 14, ex Kayaku Akzo Co.,
    type: 1,3-bis(t-butylperoxyisopropyl)benzene used in Examples 1 to 10 and Comparison Examples 1 to 12.
  KayahexaAD, trade mark, ex Kayaku Akzo Co.,
    used in Examples 11 to 23 and Comparison Examples 13 to 66.

Component (i): crosslinking aid
  NK ester 3G, ex Shin-Nakamura Chemical Co.,
    type: triethylene glycol dimethacrylate
  Daiso DAP Monomer, ex Daiso Co.
    type: diallyl phthalate monomer Component (j): antioxidant
  PEP-36, ex Asahi Denka Co., and
  Ir-1010, ex Ciba-Geigy,
    used in Examples 1 to 10 and Comparison Examples 1 to 12.
  Irganox B220, trade mark, ex Nippon Ciba-Geigy,
    used in Examples 11 to 23 and Comparison Examples 13 to 66.

Component (k): liquid polybutadiene
  R-45HT, trade mark, ex Idemitsu Petrochemical Industries Inc., having hydroxyl groups (acryl type, primary) and copolymerization-reactive unsaturated double bonds (14 bonds: 80%). The number average molecular weight: 2,800

Component (l): unsaturated glycidyl compound
  glycidyl methacrylate, ex Kanto Kagaku Co.

Component (m): unsaturated carboxylic acid derivative
  maleic anhydride, ex Kanto Kagaku Co.

Component (n):
  thermoplastic polyester type elastomer (TPEE), Nouvelan R4410ZN, trade mark, ex Teijin Co.,
  thermoplastic polyamide type elastomer (TPAE), Pebax 2533SA01, trade mark, ex Toray Co.,
  thermoplastic polyurethane type elastomer (TPUE), Pandex T-1180N, trade mark, ex Dai-Nippon Ink Chemical Industries Inc.,
  polymethylpentene (TPX), RT-31, trade mark, ex Mitsui Petrochemical Industries Inc.,
  nylon-6, A-1025, trade mark, ex Unitika Co.

Examples 1 to 10 and Comparison Examples 1 to 12, for Process P-1 and Composition C-1

Preparation Process;

In a first step, components (a) to (c), a part of component (d), components (e) and (f), an inorganic filler and an anti-oxidant were kneaded. In a second step, an organic peroxide and a crosslinking aid were kneaded with the aforesaid kneaded product. In a third step, the kneaded product and the remaining part of component (d) were kneaded.

In each of the first, second and third steps, a twin-screw kneader was operated at the following temperature at a screw rotation of 100 rpm:

first step; 230 to 240° C.,
second step; 180 to 220° C., and
third step; 200 to 220° C.

Example 1

The components were used in the amounts represented in Table 1 to prepare a resin composition. The results are as shown in Table 1. The composition of the invention was excellent in mechanical properties, oil resistance, stain resistance and stickiness.

Comparison Examples 1 and 2

In Comparison Example 1, no use was made of component (e), i.e. polyester type polymer, polyamide type polymer, or polyurethane type polymer, which are the components of the present invention. In Comparison Example 2, component (e) was used in an amount exceeding the range of the present invention. The results are as shown in Table 1. In Comparison Example 1, in which component (e) was not used, the oil resistance and stain resistance were poor. In Comparison Example 2, in which the amount of component (e) exceeded the range of the present invention, the product was hard and, therefore, moldability was poor.

Examples 2 and 3

In these Examples, the amount of component (e) was different from that in Example 1. The amount of each component and the results are as shown in Table 2. Good results were obtained as in Example 1.

Examples 4 and 5

In these Examples, another types of the resins were further blended in a composition as component (c) in addition to the resin used in Example 1. Use were made of a polyamide type copolymer in Example 4 and a polyurethane type copolymer in Example 5 as component (e). The amount of each component and the results are as shown in Table 2. Good results were obtained as in Example 1.

Example 6

In this Example, use was made of component (f), hydrogenated petroleum resin, which was an optional component in the present invention. The amount of each component and the results are as shown in Table 3. The composition was excellent in mechanical properties, oil resistance, stain resistance and stickiness.

Comparison Example 3

In this Comparison Example, the amount of component (f), which was the component according to the invention, exceeded the range of the present invention. The amount of each component and the results are as shown in Table 3. Mechanical properties, oil resistance and stain resistance were poor and the molded article exhibited surface tackiness.

Examples 7 and 8

In these Examples, the amount of component (f), hydrogenated petroleum resin, was different from that in Example 6. The amount of each component and the results are as shown in Table 3. Good results were obtained as in Example 6.

Comparison Examples 4 and 5

In Comparison Example 4, no use was made of component (c), i.e. a peroxide crosslinking type olefinic resin, which was the component according to the present invention. In Comparison Example 5, component (c) was used in the amount exceeding the range of the present invention. The amount of each component and the results are as shown in Table 4. In Comparison Example 4, the tensile elongation, oil resistance and stain resistance were poor. In Comparison Example 5, the compression set, oil resistance and stain resistance were poor.

Comparison Examples 6 and 7

The amount of component (b), i.e. a non-aromatic type softening agent for rubber, was below the range of the present invention in Comparison Example 6, while it was above the range in Comparison Example 7. The amount of each component and the results are as shown in Table 4. In Comparison Example 6, neither press molding nor injection molding could be carried out because of the occurrence of abnormal torque and abnormal resin pressure during the preparation. In Comparison Example 7, the mechanical properties, oil resistance and stain resistance were poor and the molded article exhibited stickiness.

Comparison Examples 8 and 9

The amount of component (d), i.e. a peroxide decomposing type olefinic resin, was below the range of the present invention in Comparison Example 8, while it was above the range in Comparison Example 9. In addition, component (d) was not blended in the composition in the third step in Comparison Example 8. The amount of each component and the results are as shown in Table 5. In Comparison Example 8, neither press molding nor injection molding could be carried out because of the occurrence of abnormal torque and abnormal resin pressure during the preparation. In Comparison Example 9, the resin composition was hard and, therefore, rubber elasticity was lost.

Comparison Example 10

In this Comparison Example, the amount of component (g), i.e. inorganic filler, which was an optional component in the present invention, was above the range of the present invention. The amount of each component and the results are as shown in Table 5. The mechanical properties, oil resistance and stain resistance were poor.

Examples 9 and 10

The amounts of the organic peroxide and the crosslinking aid which were blended in the second step were different from those in Example 7. The amount of each component and the results are as shown in Table 6. Good results were obtained as in Example 7.

Comparison Examples 11 and 12

In Comparison Example 11, the organic peroxide and the crosslinking aid were not used, while very large amounts of them were used in Comparison Example 12. The amount of each component and the results are as shown in Table 6. In Comparison Example 11, the rubber elasticity deteriorated and the oil resistance and stain resistance were poor. The molded article obtained exhibited stickiness. In Comparison Example 12, neither press molding nor injection molding could be carried out because of the occurrence of abnormal torque and abnormal resin pressure during the preparation.

TABLE 1

| | | Ex.1 | Comp. Ex.1 | Comp. Ex.2 |
|---|---|---|---|---|
| (a) SEPS | 4077 | 100 | 100 | 100 |
| (b) Process oil | PW90 | 120 | 120 | 120 |
| (c) PE-1 | BF-E | 23.6 | 23.6 | 23.6 |
| PE-2 | 7L | | | |
| (d) PP-1 | CJ700 | 20 | 20 | 20 |
| PP-2 | E2640 | | | |
| PP-3 | BC03B | 20 | 20 | 20 |
| (e) TPEE-1 | 4047 | 160 | 0 | 1300 |
| TPAE-1 | 2533SA01 | | | |
| TPUE-1 | E190 | | | |
| (f) Petroleum resin | P-140 | | | |
| (g) Filler | RS400 | 20 | 20 | 20 |
| Organic peroxide | Perkadox 14 | 2.3 | 2.3 | 2.3 |
| Crosslinking aid | NK Ester 3G | 4.1 | 4.1 | 4.1 |
| | Daiso DAP Monomer | 0.9 | 0.9 | 0.9 |
| Antioxidant | PEP36 | 0.2 | 0.2 | 0.2 |
| | Ir1010 | 0.2 | 0.2 | 0.2 |
| Hardness | after HDA 15 seconds | 74 | 45 | 95 |
| Tensile strength | MPa | 6.3 | 7 | 18.6 |
| 100% Modulus | MPa | 4.7 | 1.5 | 6.4 |
| Elongation | % | 250 | 550 | 520 |
| Impact resilience | % | 45 | 61 | 58 |
| Compression set | 120° C. × 72 hrs(%) | 54 | 43 | 72 |
| | 150° C. × 22 hrs(%) | 61 | 58 | 78 |
| Tearing strength | kN/m | 49 | 18 | 78 |
| Oil resistance | ASTM No.2 (120° C. × 72 hrs)(%) | 18 | 68 | 10 |
| | PW90 (30° C. × 168 hrs) | 2.8 | 18 | 0.5 |
| Stain resistance | | ○ | X | ○ |
| Moldability | | ○ | ○ | Δ |
| Stickiness | | ○ | ○ | ○ |

TABLE 2

| | | Ex.2 | Ex.3 | Ex.4 | Ex.5 |
|---|---|---|---|---|---|
| (a) SEPS | 4077 | 100 | 100 | 100 | 100 |
| (b) Process oil | PW90 | 120 | 120 | 120 | 120 |
| (c) PE-1 | BF-E | 23.6 | 23.6 | 3.6 | 3.6 |
| PE-2 | 7L | | | 20 | 20 |
| (d) PP-1 | CJ700 | 20 | 20 | 20 | 20 |
| PP-2 | E2640 | | | | |
| PP-3 | BC03B | 20 | 20 | 20 | 20 |
| (e) TPEE-1 | 4047 | 250 | 400 | | |
| TPAE-1 | 2533SA01 | | | 250 | |
| TPUE-1 | E190 | | | | 250 |
| (f) Petroleum resin | P-140 | | | | |
| (g) Filler | RS400 | 20 | 20 | 20 | 20 |
| Organic peroxide | Perkadox 14 | 2.3 | 2.3 | 2.3 | 2.3 |
| Crosslinking aid | NK Ester 30 | 4.1 | 4.1 | 4.1 | 4.1 |
| | Daiso DAP Monomer | 0.9 | 0.9 | 0.9 | 0.9 |
| Antioxidant | PEP36 | 0.2 | 0.2 | 0.2 | 0.2 |
| | Ir1010 | 0.2 | 0.2 | 0.2 | 0.2 |
| Hardness | after HDA 15 seconds | 76 | 81 | 78 | 72 |
| Tensile strength | MPa | 6.1 | 5.4 | 5.1 | 5.4 |
| 100% Modulus | MPa | 4.8 | 4.8 | 4.1 | 4.2 |
| Elongation | % | 220 | 150 | 260 | 280 |
| Impact resilience | % | 43 | 42 | 38 | 45 |
| Compression set | 120° C. × 72 hrs(%) | 58 | 60 | 67 | 60 |
| | 150° C. × 22 hrs(%) | 64 | 65 | 78 | 68 |
| Tearing strength | kN/m | 55 | 68 | 52 | 46 |
| Oil resistance | ASTM No.2 (120° C. × 72hrs)(%) | 16 | 12 | 14 | 16 |
| | PW90 (30° C. × 168 hrs) | 2.2 | 1.8 | 1.9 | 2.3 |
| Stain resistance | | ○ | ○ | ○ | ○ |
| Moldability | | ○ | ○ | ○ | ○ |
| Stickiness | | ○ | ○ | ○ | ○ |

TABLE 3

| | | Ex.6 | Ex.7 | Ex.8 | Comp. Ex.3 |
|---|---|---|---|---|---|
| (a) SEPS | 4077 | 100 | 100 | 100 | 100 |
| (b) Process oil | PW90 | 180 | 180 | 180 | 180 |
| (c) PE-1 | BF-E | 23.6 | 43.6 | 63.6 | 43.6 |
| PE-2 | 7L | | | | |
| (d) PP-1 | CJ700 | | | | |
| PP-2 | E2640 | 10 | 10 | 10 | 10 |
| PP-3 | BC03B | 20 | 20 | 20 | 20 |
| (e) TPEE-1 | 4047 | 250 | 250 | 250 | 250 |
| TPAE-1 | 2533SA01 | | | | |
| TPUE-1 | E190 | | | | |
| (f) Petroleum resin | P-140 | 10 | 10 | 10 | 150 |
| (g) Filler | RS400 | 20 | 20 | 20 | 20 |
| Organic peroxide | Perkadox 14 | 2.3 | 2.3 | 2.3 | 2.3 |
| Crosslinking aid | NK Ester 30 | 4.1 | 4.1 | 4.1 | 4.1 |
| | Daiso DAP Monomer | 0.9 | 0.9 | 0.9 | 0.9 |
| Antioxidant | PEP36 | 0.2 | 0.2 | 0.2 | 0.2 |
| | Ir1010 | 0.2 | 0.2 | 0.2 | 0.2 |
| Hardness | after HDA 15 seconds | 64 | 66 | 69 | 56 |
| Tensile strength | MPa | 5.3 | 5.5 | 5.8 | 4.8 |
| 100% Modulus | MPa | 4.6 | 4.7 | 4.6 | 3.5 |
| Elongation | % | 280 | 300 | 310 | 240 |
| Impact resilience | % | 48 | 47 | 46 | 45 |
| Compression set | 120° C. × 72 hrs(%) | 54 | 58 | 60 | 65 |
| | 150° C. × 22 hrs(%) | 62 | 65 | 68 | 75 |
| Tearing strength | kN/m | 48 | 46 | 46 | 40 |
| Oil resistance | ASTM No.2 (120° C. × 72hrs) (%) | 28 | 25 | 25 | 58 |
| | PW90 (30° C. × 168 hrs) | 4.5 | 4.3 | 4.1 | 10 |
| Stain resistance | | ○ | ○ | ○ | Δ |
| Moldability | | ○ | ○ | ○ | X |
| Stickiness | | ○ | ○ | ○ | X |

TABLE 4

| | | Comp.Ex.4 | Comp.Ex.5 | Comp.Ex.6 | Comp.Ex.7 |
|---|---|---|---|---|---|
| (a) SEPS | 4077 | 100 | 100 | 100 | 100 |
| (b) Process Oil | PW90 | 180 | 180 | 15 | 350 |
| (c) PE-1 | BF-E | 0 | 180 | 43.6 | 43.6 |
| PE-2 | 7L | | | | |

TABLE 4-continued

|  |  | Comp.Ex.4 | Comp.Ex.5 | Comp.Ex.6 | Comp.Ex.7 |
|---|---|---|---|---|---|
| (d) PP-1 | CJ700 |  |  |  |  |
| PP-2 | E2640 | 10 | 10 | 10 | 10 |
| PP-3 | BC03B | 20 | 20 | 20 | 20 |
| (e)TPEE-1 | 4047 | 250 | 250 | 250 | 250 |
| TPAE-1 | 2533SA01 |  |  |  |  |
| TPUE-1 | E190 |  |  |  |  |
| (f) Petroleum resin | P-140 | 10 | 10 | 10 | 10 |
| (g) Filler | RS400 | 20 | 20 | 20 | 20 |
| Organic peroxide | Perkadox 14 | 2.3 | 2.3 | 2.3 | 2.3 |
| Crosslinking aid | NK Ester 3G | 4.1 | 4.1 | 4.1 | 4.1 |
|  | Daiso DAP Monomer | 0.9 | 0.9 | 0.9 | 0.9 |
| Antioxidant | PEP36 | 0.2 | 0.2 | 0.2 | 0.2 |
|  | Ir1010 | 0.2 | 0.2 | 0.2 | 0.2 |
| Hardness | after HDA 15 seconds | 60 | 75 | unproductable | 48 |
| Tensile strength | MPa | 8.2 | 10.3 |  | 3.2 |
| 100% Modulus | MPa | 2.1 | 5.1 |  | 1.6 |
| Elongation | % | 120 | 450 |  | 180 |
| Impact resilience | % | 44 | 45 |  | 43 |
| Compression set | 120° C. × 72 hrs(%) | 60 | 65 |  | 73 |
|  | 150° C. × 22 hrs(%) | 65 | 74 |  | 80 |
| Tearing strength | kN/m | 30 | 50 |  | 38 |
| Oil resistance | ASTM No.2 (120° C. × 72 hrs)(%) | 40 | 45 |  | 52 |
|  | PW90 (30° C. × 168 hrs) | 5.5 | 5 |  | 12 |
| Stain resistance |  | Δ | Δ |  | Δ |
| Moldability |  | ○ | ○ |  | X |
| Stickiness |  | ○ | ○ |  | X |

TABLE 5

|  |  | Comp.Ex.8 | Comp.Ex.9 | Comp.Ex.10 |
|---|---|---|---|---|
| (a) SEPS | 4077 | 100 | 100 | 100 |
| (b) Process oil | PW90 | 180 | 180 | 180 |
| (c) PE-1 | BF-E | 43.6 | 43.6 | 43.6 |
| PE-2 | 7L |  |  |  |
| (d)PP-1 | CJ700 |  |  |  |
| PP-2 | E2640 | 5 | 10 | 10 |
| PP-3 | BC03B | 0 | 180 | 20 |
| (e)TPEE-1 | 4047 | 250 | 250 | 250 |
| TPAE-1 | 2533SA01 |  |  |  |
| TPUE-1 | E190 |  |  |  |
| (f) Petroleum resin | P-140 | 10 | 10 | 10 |
| (g) Filler | RS400 | 20 | 20 | 120 |
| Organic peroxide | Perkadox 14 | 2.3 | 2.3 | 2.3 |
| Crosslinking aid | NK Ester 3G | 4.1 | 4.1 | 4.1 |
|  | Daiso DAP Monomer | 0.9 | 0.9 | 0.9 |
| Antioxidant | PEP36 | 0.2 | 0.2 | 0.2 |
|  | Ir1010 | 0.2 | 0.2 | 0.2 |
| Hardness | after HDA 15 seconds | unproductable | 98 | 75 |
| Tensile strength | MPa |  | 17.2 | 5 |
| 100% Modulus | MPa |  | 5.6 | 4.3 |
| Elongation | % |  | 550 | 80 |
| Impact resilience | % |  | 32 | 30 |
| Compression set | 120° C. × 72 hrs(%) |  | 78 | 65 |
|  | 150° C. × 22 hrs(%) |  | 92 | 73 |
| Tearing strength | kN/m |  | 52 | 37 |
| Oil resistance | ASTM No.2 (120° C. × 72 hrs)(%) |  | 18 | 20 |
|  | PW90 (30° C. × 168 hrs) |  | 1.8 | 3.5 |
| Stain resistance |  |  | ○ | X |
| Moldability |  |  | ○ | X |
| Stickiness |  |  | ○ | ○ |

TABLE 6

|   |   | Ex.9 | Ex.10 | Comp.Ex.11 | Comp.Ex.12 |
|---|---|---|---|---|---|
| (a) SEPS | 4077 | 100 | 100 | 100 | 100 |
| (b) Process oil | PW90 | 180 | 180 | 180 | 180 |
| (c) PE-1 | BF-E | 43.6 | 43.6 | 43.6 | 43.6 |
| PE-2 | 7L | | | | |
| (d) PP-1 | CJ700 | | | | |
| PP-2 | E2640 | 10 | 10 | 10 | 10 |
| PP-3 | BC03B | 20 | 20 | 20 | 20 |
| (e) TPEE-1 | 4047 | 250 | 250 | 250 | 250 |
| TPAE-1 | 2533SA01 | | | | |
| TPUE-1 | E190 | | | | |
| (f) Petroleum resin | P-140 | 10 | 10 | 10 | 10 |
| (g) Filler | RS400 | 20 | 20 | 20 | 20 |
| Organic peroxide | Perkadox 14 | 3 | 3.75 | 0 | 20 |
| Crosslinking aid | NK Ester 3G | 5.4 | 6.75 | 0 | 36 |
|  | Daiso DAP Monomer | 1.2 | 1.5 | 0 | 8 |
| Antioxidant | PEP36 | 0.2 | 0.2 | 0.2 | 0.2 |
|  | Ir1010 | 0.2 | 0.2 | 0.2 | 0.2 |
| Hardness | after HDA 15 seconds | 67 | 69 | 70 | unproductable |
| Tensile strength | MPa | 5.1 | 4.8 | 7 | |
| 100% Modulus | MPa | 4.8 | 5 | 3.2 | |
| Elongation | % | 260 | 210 | 580 | |
| Impact resilience | % | 48 | 50 | 53 | |
| Compression set | 120° C. × 72 hrs(%) | 52 | 55 | 80 | |
|  | 150° C. × 22 hrs(%) | 60 | 62 | 95 | |
| Tearing strength | kN/m | 52 | 50 | 33 | |
| Oil resistance | ASTM No.2 (120° C. × 72 hrs)(%) | 20 | 18 | 65 | |
|  | PW90 (30° C. × 168 hrs) | 4 | 3.5 | 20 | |
| Stain resistance |  | ◯ | ◯ | X | |
| Moldability |  | ◯ | ◯ | ◯ | |
| Stickiness |  | ◯ | ◯ | X | |

The following Examples and Comparison Examples are for the processes P-2 and P-3 and the Cmposition C-2.

Examples 11 and 12 and Comparison Examples 13 to 22

Component (n) was not used here.

Each component was used in the amount indicated in Table 7 in part by weight. The whole amounts of components (a), (b), (c), (k), (l), (m), (g) and (j) and a part of component (d), which amount is indicated before symbol "+" in Table 7, were introduced all together into a twin extruder with an L/D of 62.5 and started to be melt kneaded at a kneading temperature of 180° C. and a screw rotation speed of 350 rpm. Next, the whole amounts of components (h) and (i) were side fed and the melt kneading was still continued. Subsequently, the remaining part of component (d), which amount is indicated after symbol "+" in Table 7, was side fed, melt kneaded at 200° C. and pelletized. In Comparison Example 13, the whole of component (d) was introduced into the twin-screw extruder together with the whole of components (a), (b), (c), (k), (l), (m), (g) and (j) and melt kneaded. The pellets obtained were put in a predetermined mold and then pressed in the conditions of 220° C. and 50 kg/cm² to obtain each sheet for the aforesaid evaluation methods (1) to (4), (6) to (8) and (12). For evaluation methods (13) and (14), the pellets thus obtained were injection molded in the conditions described in evaluation method (13). For evaluation method (15), the pellets thus obtained were injection molded in the conditions described in evaluation method (15).

The results are as shown in Table 8.

TABLE 7

| Amount of Component, part by weight | Ex. | | Comparison Example | | | | | | | | | |
|---|---|---|---|---|---|---|---|---|---|---|---|---|
|  | 11 | 12 | 13[*1] | 14 | 15 | 16 | 17 | 18 | 19 | 20 | 21 | 22 |
| (a) | 100 | 100 | 100 | 100 | 100 | 100 | 100 | 100 | 100 | 100 | 100 | 100 |
| (b) | 100 | 100 | 100 | 100 | 100 | 100 | 100 | 100 | 100 | 100 | 100 | 100 |
| (c) | 5 | 0 | 5 | 5 | 5 | 5 | 5 | 5 | 5 | 5 | 5 | 5 |
| (d) | 15 + 30 | 15 + 30 | 45 | 15 + 30 | 15 + 30 | 15 + 30 | 15 + 30 | 15 + 30 | 15 + 30 | 15 + 30 | 15 + 30 | 15 + 30 |
| (k) | 10 | 10 | 10 | 0 | 0 | 40 | 10 | 10 | 10 | 10 | 10 | 10 |
| (l) | 4 | 4 | 4 | 0 | 4 | 4 | 0 | 20 | 4 | 4 | 4 | 4 |
| (m) | 4 | 4 | 4 | 0 | 4 | 4 | 4 | 4 | 0 | 20 | 4 | 4 |
| (n) | — | — | — | — | — | — | — | — | — | — | — | — |
| (g) | 20 | 20 | 20 | 20 | 20 | 20 | 20 | 20 | 20 | 20 | 20 | 20 |
| (h) | 1.75 | 1.75 | 1.75 | 1.75 | 1.75 | 1.75 | 1.75 | 1.75 | 1.75 | 1.75 | 4.5 | 0 |
| (i) | 3.15 | 3.15 | 3.15 | 3.15 | 3.15 | 3.15 | 3.15 | 3.15 | 3.15 | 3.15 | 10 | 0 |
| (j) | 0.4 | 0.4 | 0.4 | 0.4 | 0.4 | 0.4 | 0.4 | 0.4 | 0.4 | 0.4 | 0.4 | 0.4 |

[*1]Component (d) was kneaded all in step (I).

TABLE 8

| Properties of the composition | Ex. | | Comparison Example | | | | | | | | | |
|---|---|---|---|---|---|---|---|---|---|---|---|---|
| | 11 | 12 | 13*1 | 14 | 15 | 16 | 17 | 18 | 19 | 20 | 21 | 22 |
| Specific gravity | 0.92 | 0.92 | 0.92 | 0.92 | 0.92 | 0.93 | 0.92 | 0.92 | 0.92 | 0.92 | — | 0.92 |
| Hardness, after HDA 15 seconds | 65 | 65 | 62 | 68 | 66 | 64 | 65 | 63 | 65 | 62 | — | 52 |
| Tensile strength, MPa | | | | | | | | | | | | |
| 23° C. | 11.5 | 11.5 | 6 | 9.5 | 9.7 | 9 | 10 | 9.5 | 10 | 9.8 | — | 13 |
| 120° C. | 0.3 | 0.3 | 0.3 | 0 | 0 | 0 | 0 | 0 | 0 | 0 | — | 0 |
| 150° C. | 0 | 0 | 0 | 0 | 0 | 0 | 0 | 0 | 0 | 0 | — | 0 |
| Tensile elongation, % | 850 | 850 | 450 | 650 | 750 | 780 | 800 | 700 | 800 | 680 | — | 900 |
| Stress at 100% elongation, MPa | 5.3 | 5.3 | 3.8 | 4.3 | 3.8 | 3.5 | 3.8 | 4 | 3.8 | 3.3 | — | 3 |
| Tearing strength, kN/m | 58 | 58 | 65 | 50 | 48 | 45 | 45 | 40 | 45 | 38 | — | 40 |
| Compression set, % | 40 | 40 | 40 | 48 | 48 | 58 | 48 | 60 | 50 | 62 | — | 68 |
| Taber abrasion, mg | 200 | 200 | 200 | 250 | 250 | 250 | 250 | 300 | 250 | 300 | — | 350 |
| Oil resistance | | | | | | | | | | | | |
| Weight change, % | 60 | 60 | 60 | 65 | — | — | — | — | — | — | — | soluble |
| Volume change, % | 50 | 50 | 50 | 53 | — | — | — | — | — | — | — | — |
| Moldability | ◯ | ◯ | ◯ | ◯ | ◯ | ◯ | ◯ | ◯ | ◯ | ◯ | *2 | ◯ |
| Bleedout property | ◯ | ◯ | ◯ | ◯ | ◯ | ◯ | ◯ | Δ | ◯ | Δ | — | ◯ |

*1Component (d) was kneaded all in step (I).
*2: No test piece could be produced In Examples 11 and 12, the elastomer compositions were prepared according to the present process. Both elastomer compositions exhibit good properties whether the optional component (c) was used or not.

Meanwhile, in Comparison Example 13, component (d) was kneaded all in step (I) with the other components in the same composition as in Example 11. Considerable decreases in tensile strength, tensile elongation and elongation stress were observed. In Comparison Example 14, components (k), (l) and (m) were not blended. Decreases in tensile strength, tensile elongation, elongation stress and tearing strength were observed. The taber abrasion increased. In addition, the oil resistance deteriorated slightly. In Comparison Example 15, component (k) was not blended, while in Comparison Example 16, the amount of component (k) was above the range of the present invention. In both compositions, decreases in tensile strength, tensile elongation, elongation stress and tearing strength were observed and the taber abrasion increased. In Comparison Example 17, component (l) was not blended, while in Comparison Example 18, the amount of component (l) was above the range of the present invention. In both compositions, decreases in tensile strength, tensile elongation, elongation stress and tearing strength were observed and the taber abrasion increased. In Comparison Example 18, the increase in taber abrasion was remarkable and the bleedout property deteriorated slightly. In Comparison Example 19, component (m) was not blended, while in Comparison Example 20, the amount of component (m) was above the range of the present invention. In both compositions, decreases in tensile strength, tensile elongation, elongation stress and tearing strength were observed and the taber abrasion increased. In Comparison Example 20, the incerease in taber abrasion was remarkable and the bleedout property deteriorated slightly. In Comparison Example 21, the amount of component (h) was above the range of the present invention. Overload took place on the twin-screw extruder and strand appearance deteriorated remakably. Accordingly, the preparation of the pellets could not be carried out and, therefore, no test piece could be prepared. As a result, any characteristic property could not be determined. In Comparison Example 22, component (h) was not blended. Decreases in hardness, elongation stress and tearing strength were observed and the taber abrasion increased. In the oil resistance test, the composition was completely dissolved in ASTM No. 2 oil. Accordingly, it was not recognized to have oil resistance at all.

Examples 13 to 15 and Comparison Examples 23 to 36

A thermoplastic polyester type elastomer (TPEE) was used as component (n).

Each component was used in the amount indicated in Tables 9 and 11 in part by weight. The whole amounts of components (a), (b), (c), (d), (k), (l), (m), (g) and (j) were introduced all together into a twin-screw extruder with a L/D of 62.5 and started to be melt kneaded at a kneading temperature of 180 to 210° C. and a screw rotation speed of 350 rpm. Next, the whole amounts of components (h) and (i) were side fed and the melt kneading was still continued. Subsequently, the whole of component (n), TPEE, was side fed, melt kneaded at 200 to 220° C. and pelletized. In Comparison Example 23, the whole of component (n) was introduced into the twin-screw extruder, together with the whole of components (a), (b), (c), (d), (k), (l), (m), (g) and (j), and melt kneaded at 180 to 220° C. Characteristics were determined as mentioned above.

The results are as shown in Tables 10 and 12.

TABLE 9

| Amount of Component, | Example | | |
|---|---|---|---|
| part by weight | 13 | 14 | 15 |
| (a) | 100 | 100 | 100 |
| (b) | 100 | 100 | 100 |
| (c) | 5 | 5 | 0 |
| (d) | 15 | 15 | 15 |
| (k) | 10 | 10 | 10 |
| (l) | 4 | 4 | 4 |
| (m) | 4 | 4 | 4 |
| (n) TPEE | 400 | 750 | 400 |
| (g) | 20 | 20 | 20 |
| (h) | 1.75 | 1.75 | 1.75 |
| (i) | 3.15 | 3.15 | 3.15 |
| (j) | 0.4 | 0.4 | 0.4 |

TABLE 10

| Properties of the composition | Example 13 | Example 14 | Example 15 |
|---|---|---|---|
| Specific gravity | 1.03 | 1.14 | 1.03 |
| Hardness, after HDA 15 seconds | 74 | 82 | 74 |
| Tensile strength, MPa 23° C. | 19.6 | 23.5 | 19.6 |
| 120° C. | — | — | — |
| 150° C. | — | — | — |
| Tensile elongation, % | 840 | 860 | 840 |
| Stress at 100% elongation | — | — | — |
| Tearing strength, kN/m | 58 | 75 | 58 |
| Compression set, % | 55 | — | — |
| Taber abrasion, mg | 50 | — | — |
| Oil resistance Weight change, % | — | — | — |
| Volume change, % | — | — | — |
| Moldability | ○ | ○ | ○ |
| Bleedout property | ○ | ○ | ○ |
| Adhesive property, kg/25 mm | | | |
| vinyl chloride | 8 | 12 | 8 |
| polysulfone | 7 | 10 | 7 |
| polyphenylene ether | 1 | 3 | 1 |
| ABS | 8 | 10 | 8 |
| polystyrene | 2 | 1.5 | 2 |
| polymethyl methacrylate | 4 | 4.5 | 4 |
| polycarbonate | 12 | 14 | 12 |
| high-density polyethylene | 0.5 | 0 | 0.5 |
| polypropylene | 0.5 | 0 | 0.5 |
| nylon | 0 | 0 | 0 |

TABLE 11

| Amount of Component, part by weight | 23*[3] | 24 | 25 | 26 | 27 | 28 | 29 | 30 | 31 | 32 | 33 | 34 | 35 | 36 |
|---|---|---|---|---|---|---|---|---|---|---|---|---|---|---|
| (a) | 100 | 100 | 100 | 100 | 100 | 100 | 100 | 100 | 100 | 100 | 100 | 100 | 100 | 100 |
| (b) | 100 | 100 | 100 | 100 | 100 | 100 | 100 | 100 | 10 | 350 | 100 | 100 | 100 | 100 |
| (c) | 5 | 5 | 5 | 5 | 5 | 5 | 5 | 5 | 5 | 5 | 120 | 5 | 5 | 5 |
| (d) | 15 | 15 | 15 | 15 | 15 | 15 | 15 | 15 | 15 | 15 | 15 | 2 | 120 | 15 |
| (k) | 10 | 0 | 40 | 10 | 10 | 10 | 10 | 10 | 10 | 10 | 10 | 10 | 10 | 10 |
| (l) | 4 | 4 | 4 | 0 | 20 | 4 | 4 | 4 | 4 | 4 | 4 | 4 | 4 | 4 |
| (m) | 4 | 4 | 4 | 4 | 4 | 0 | 20 | 4 | 4 | 4 | 4 | 4 | 4 | 4 |
| (n) TPEE | 400 | 400 | 400 | 400 | 400 | 400 | 400 | 400 | 400 | 400 | 400 | 400 | 400 | 8 |
| (g) | 20 | 20 | 20 | 20 | 20 | 20 | 20 | 20 | 20 | 20 | 20 | 20 | 20 | 20 |
| (h) | 1.75 | 1.75 | 1.75 | 1.75 | 1.75 | 1.75 | 1.75 | 1.75 | 0 | 1.75 | 1.75 | 1.75 | 1.75 | 1.75 |
| (i) | 3.15 | 3.15 | 3.15 | 3.15 | 3.15 | 3.15 | 3.15 | 0 | 3.15 | 3.15 | 3.15 | 3.15 | 3.15 | 3.15 |
| (j) | 0.4 | 0.4 | 0.4 | 0.4 | 0.4 | 0.4 | 0.4 | 0.4 | 0.4 | 0.4 | 0.4 | 0.4 | 0.4 | 0.4 |

*[3]Comparison Example in which compound (n), TPEE, was kneaded all in step (I).

TABLE 12

| Properties of the composition | 23*[3] | 24 | 25 | 26 | 27 | 28 | 29 | 30 | 31 | 32 | 33 | 34 | 35 | 36 |
|---|---|---|---|---|---|---|---|---|---|---|---|---|---|---|
| Specific gravity | 1.03 | 1.03 | 1.02 | 1.03 | — | 1.03 | 1.03 | 1.03 | — | — | — | — | — | 0.93 |
| Hardness, after HDA 15 seconds | 65 | 73 | 74 | 74 | — | 73 | 75 | 73 | — | — | 97 | — | 97 | 45 |
| Tensile strength, MPa | | | | | | | | | | | | | | |
| 23° C. | 5.3 | 18.4 | 19.0 | 13 | — | 19.4 | 16.5 | 14.8 | — | 9.8 | — | — | — | 5.8 |
| 120° C. | 0 | — | — | — | — | — | — | — | — | — | — | — | — | — |
| 150° C. | 0 | — | — | — | — | — | — | — | — | — | — | — | — | — |
| Tensile elongation, % | 350 | 850 | 800 | 600 | — | 850 | 720 | 680 | — | 470 | — | — | — | 520 |
| Stress at 100% elongation, MPa | — | — | — | — | — | — | — | — | — | — | — | — | — | — |
| Tearing strength, kN/m | 40 | 60 | 57 | 66 | 65 | 56 | 58 | — | — | — | — | — | — | 48 |
| Compression set, % | 55 | — | — | — | — | — | — | — | — | — | — | — | — | — |
| Taber abrasion, mg | 300 | — | — | — | — | — | — | — | — | — | — | — | — | — |
| Oil resistance | | | | | | | | | | | | | | |
| Weight change, % | — | — | — | — | — | — | — | — | — | — | — | — | — | — |
| Volume change, % | — | — | — | — | — | — | — | — | — | — | — | — | — | — |
| Moldability | ○ | Δ | ○ | Δ | ○ | Δ | ○ | ○ | × | ○ | ○ | × | ○ | Δ |
| Bleedout property | ○ | ○ | Δ | ○ | Δ | ○ | Δ | ○ | ○ | × | × | ○ | × | ○ |
| Adhesive property, kg/25 mm | | | | | | | | | | | | | | |
| vinyl chloride | 3 | — | — | — | — | — | — | — | — | — | — | — | — | 0 |
| polysulfone | 3 | — | — | — | — | — | — | — | — | — | — | — | — | 0 |
| polyphenylene ether | 0.5 | — | — | — | — | — | — | — | — | — | — | — | — | 0 |
| ABS | 3.5 | — | — | — | — | — | — | — | — | — | — | — | — | 0.5 |
| polystyrene | 1 | — | — | — | — | — | — | — | — | — | — | — | — | 0.5 |

TABLE 12-continued

| Properties of the composition | 23*[3] | Comparison Example |  |  |  |  |  |  |  |  |  |  |  |
|---|---|---|---|---|---|---|---|---|---|---|---|---|---|
|  |  | 24 | 25 | 26 | 27 | 28 | 29 | 30 | 31 | 32 | 33 | 34 | 35 | 36 |
| polymethyl methacrylate | 2 | — | — | — | — | — | — | — | — | — | — | — | — | 0 |
| polycarbonate | 35 | — | — | — | — | — | — | — | — | — | — | — | — | 0 |
| high-density polyethylene | 0.5 | — | — | — | — | — | — | — | — | — | — | — | — | 1.5 |
| polypropylene | 0.5 | — | — | — | — | — | — | — | — | — | — | — | — | 3 |
| nylon | 0 | — | — | — | — | — | — | — | — | — | — | — | — | 0 |

*[3]Comparison Example in which component (n), TPEE, was kneaded all in step (I).

In Examples 13 to 15, the elastomer compositions were prepared according to the present process. In Example 14, the amount of (n) blended increased within the range of the present invention. The hardness, tensile strength, tensile elongation and tearing strength increased. The adhesive property to polystyrene, high density polyethylene and polypropylene decreased, while that to the other resins increased. In Example 15, optional component (c) was not blended. The properties were good as in Example 13.

Meanwhile, in Comparison Example 23, component (n) was kneaded all in step (I) with the other components in the same compositions as in Example 13. Decreases in hardness, tensile strength, tensile elongation and tearing strength were observed and the taber abrasion increased. The adhesive property to all of the resins except polycarbonate, high density polyethylene and polypropylene decreased. In Comparison Example 24, component (k) was not blended, while in Comparison Example 25, the amount of component (k) was above the range of the present invention. In Comparison Example 24, the tensile strength decreased and the moldability deteriorated slightly. In Comparison Example 25, decreases in tensile strength, tensile elongation and tearing strength were observed and the bleedout property deteriorated slightly. In Comparison Example 26, component (l) was not blended, while in Comparison Example 27, the amount of component (l) was above the range of the present invention. In Comparison Example 26, the tensile strength and tensile elongation decreased and the moldability deteriorated slightly. In Comparison Example 27, the bleedout property deteriorated slightly. In Comparison Example 28, component (m) was not blended, while in Comparison Example 29, the amount of component (m) was above the range of the present invention. In Comparison Example 28, the moldability deteriorated slightly. In Comparison Example 29, the tensile strength and tensile elongation decreased and the bleedout property deteriorated slightly. In Comparison Example 30, organic peroxide (h) was not blended. The tensile strength and tensile elongation decreased considerably. In Comparison Example 31, the amount of component (b) was below the range of the present invention, while in Comparison Example 32, it was above the range. In Comparison Example 31, the moldability deteriorated considerably. In Comparison Example 32, the tensile strength and tensile elongation decreased considerably and the bleedout property deteriorated considerably. In Comparison Example 33, the amount of component (c) was above the range of the present invention. The hardness was too high and the bleedout property deteriorated considerably. In Comparison Example 34, the amount of component (d) was below the range of the present invention, while in Comparison Example 35, it was above the range. In Comparison Example 34, the moldability deteriorated considerably. In Comparison Example 35, the hardness was too high and the bleedout property deteriorated considerably. In Comparison Example 36, the amount of component (n) was below the range of the present invention. Decreases in hardness, tensile strength, tensile elongation and tearing strength were observed and the moldability deteriorated slightly. The adhesive property decreased in all of the resins except high density polyethylene and polypropylene.

Example 16 and Comparison Examples 37 to 44

A thermoplastic polyurethane type elastomer (TPUE) was used as component (n).

Each component was used in the amount indicated in Table 13 in part by weight. Pelletization was carried out as in the case where a thermoplastic polyester type elastomer (TPEE) was used as component (n), after which the properties of the composition were determined.

The results are as shown in Table 14.

TABLE 13

| Amount of Component, part by weight | Ex. 16 | Comparison Example |  |  |  |  |  |  |  |
|---|---|---|---|---|---|---|---|---|---|
|  |  | 37*[3] | 38 | 39 | 40 | 41 | 42 | 43 | 44 |
| (a) | 100 | 100 | 100 | 100 | 100 | 100 | 100 | 100 | 100 |
| (b) | 100 | 100 | 100 | 100 | 100 | 100 | 100 | 100 | 100 |
| (c) | 5 | 5 | 5 | 5 | 5 | 5 | 5 | 5 | 5 |
| (d) | 15 | 15 | 15 | 15 | 15 | 15 | 15 | 15 | 15 |
| (k) | 10 | 10 | 0 | 40 | 10 | 10 | 10 | 10 | 10 |
| (l) | 4 | 4 | 4 | 4 | 0 | 20 | 4 | 4 | 4 |
| (m) | 4 | 4 | 4 | 4 | 4 | 4 | 0 | 20 | 4 |
| (n) TPUE | 400 | 400 | 400 | 400 | 400 | 400 | 400 | 400 | 400 |
| (g) | 20 | 20 | 20 | 20 | 20 | 20 | 20 | 20 | 20 |
| (h) | 1.75 | 1.75 | 1.75 | 1.75 | 1.75 | 1.75 | 1.75 | 1.75 | 0 |
| (i) | 3.15 | 3.15 | 3.15 | 3.15 | 3.15 | 3.15 | 3.15 | 3.15 | 0 |
| (j) | 0.4 | 0.4 | 0.4 | 0.4 | 0.4 | 0.4 | 0.4 | 0.4 | 0.4 |

*[3]Comparison Example in which component (n), TPUE, was kneaded all in step (I).

TABLE 14

| Properites of the composition | Ex. 16 | Comparison Examples | | | | | | | |
|---|---|---|---|---|---|---|---|---|---|
| | | 37*[3] | 38 | 39 | 40 | 41 | 42 | 43 | 44 |
| Specific gravity | 1.07 | 1.07 | 1.07 | 1.07 | 1.07 | 1.07 | 1.07 | 1.07 | 1.07 |
| Hardness, after HDA 15 seconds | 67 | 67 | 68 | 69 | 67 | 66 | 67 | 69 | 69 |
| Tensile strength, MPa | | | | | | | | | |
| 23° C. | 18.2 | 18.2 | 17.7 | 16.6 | 17.9 | 15.7 | 12.1 | 18.4 | 16.9 |
| 120° C. | — | — | — | — | — | — | — | — | — |
| 150° C. | — | — | — | — | — | — | — | — | — |
| Tensile elongation, % | 570 | 570 | 540 | 600 | 540 | 480 | 620 | 620 | 640 |
| Stress at 100% elongation, MPa | — | — | — | — | — | — | — | — | — |
| Tearing strength, kN/m | 55 | 38 | — | — | — | — | — | — | — |
| Compression set, % | 54 | 80 | — | — | — | — | — | — | — |
| Taber abrasion, mg | 20 | 250 | — | — | — | — | — | — | — |
| Oil resistance | | | | | | | | | |
| Weight change, % | — | — | — | — | — | — | — | — | — |
| Volume change, % | — | — | — | — | — | — | — | — | — |
| Moldability | ○ | ○ | Δ | ○ | Δ | ○ | Δ | ○ | ○ |
| Bleedout property | ○ | ○ | ○ | Δ | ○ | Δ | ○ | Δ | ○ |
| Adhesive property, kg/25 mm | | | | | | | | | |
| vinyl chloride | 7 | 3 | — | — | — | — | — | — | — |
| polysulfone | 6 | 2 | — | — | — | — | — | — | — |
| polyphenylene ether | 1 | 0.5 | — | — | — | — | — | — | — |
| ABS | 8 | 3 | — | — | — | — | — | — | — |
| polystyrene | 2 | 1 | — | — | — | — | — | — | — |
| polymethyl methacrylate | 4 | 2 | — | — | — | — | — | — | — |
| polycarbonate | 12 | 4 | — | — | — | — | — | — | — |
| high-density polyethylene | 0.5 | 0 | — | — | — | — | — | — | — |
| polypropylene | 0.5 | 0 | — | — | — | — | — | — | — |
| nylon | 0 | 0 | — | — | — | — | — | — | — |

*[3]Comparison Example in which component (n), TPUE, was kneaded all in step (I).

In Example 16, the elastomer composition was prepared according to the present process. The properties were good.

Meanwhile, in Comparison Example 37, component (n) was kneaded all in step (I) with the other components in the same composition as in Example 16. The tearing strength decreased and the taber abrasion increased considerably. The adhesive property decreased for all of the resins. In Comparison Example 38, component (k) was not blended, while in Comparison Example 39, the amount of component (k) was above the range of the present invention. In both compositions, the tensil strength decreased. In Comparison Example 38, the moldability deteriorated slightly, while in Comparison Example 39, the bleedout property deteriorated slightly. In Comparison Example 40, component (l) was not blended, while in Comparison Example 41, the amount of component (l) was above the range of the present invention. In Comparison Example 40, the tensile strength and tensile elongation decreased slightly and the moldability deteriorated slightly. In Comparison Example 41, the tensile strength and tensile elongation decreased and the bleedout property deteriorated slightly. In Comparison Example 42, component (m) was not blended, while in Comparison Example 43, the amount of component (m) was above the range of the present invention. In Comparison Example 42, the tensile strength decreased considerably and the moldability deteriorated slightly. In Comparison Example 43, the bleedout property deteriorated slightly. In Comparison Example 44, organic peroxide (h) was not blended. The tensile strength decreased considerably.

Example 17 and Comparison Examples 45 to 53

A thermoplastic polyamide type elastomer (TPAE) was used as component (n).

Each component was used in the amount indicated in Table 15 in part by weight. Pelletization was carried out as in the case where a thermoplastic polyester type elastomer (TPEE) was used as component (n), after which the properties of the composition were determined. The results are as shown in Table 16.

TABLE 15

| Amount of Component, part by weight | Ex. 17 | Comparison Example | | | | | | | | |
|---|---|---|---|---|---|---|---|---|---|---|
| | | 45*[3] | 46 | 47 | 48 | 49 | 50 | 51 | 52 | 53 |
| (a) | 100 | 100 | 100 | 100 | 100 | 100 | 100 | 100 | 100 | 100 |
| (b) | 100 | 100 | 100 | 100 | 100 | 100 | 100 | 100 | 100 | 100 |
| (c) | 5 | 5 | 5 | 5 | 5 | 5 | 5 | 5 | 5 | 5 |
| (d) | 15 | 15 | 15 | 15 | 15 | 15 | 15 | 15 | 15 | 15 |
| (k) | 10 | 10 | 0 | 10 | 0 | 40 | 10 | 10 | 10 | 10 |
| (l) | 4 | 4 | 0 | 4 | 4 | 4 | 0 | 20 | 4 | 4 |

TABLE 15-continued

| Amount of Component, part by weight | Ex. 17 | Comparison Example | | | | | | | | |
|---|---|---|---|---|---|---|---|---|---|---|
| | | 45*[3] | 46 | 47 | 48 | 49 | 50 | 51 | 52 | 53 |
| (m) | 4 | 4 | 0 | 4 | 4 | 4 | 4 | 4 | 0 | 20 |
| (n) TPAE | 400 | 400 | 400 | 400 | 400 | 400 | 400 | 400 | 400 | 400 |
| (g) | 20 | 20 | 20 | 20 | 20 | 20 | 20 | 20 | 20 | 20 |
| (h) | 1.75 | 1.75 | 1.75 | 0 | 1.75 | 1.75 | 1.75 | 1.75 | 1.75 | 1.75 |
| (i) | 3.15 | 3.15 | 3.15 | 0 | 3.15 | 3.15 | 3.15 | 3.15 | 3.15 | 3.15 |
| (j) | 0.4 | 0.4 | 0.4 | 0.4 | 0.4 | 0.4 | 0.4 | 0.4 | 0.4 | 0.4 |

*[3]Comparison Example in which component (n), TPAE, was kneaded all in step (I).

TABLE 16

| Properties of the composition | Ex. 17 | Comparison Example | | | | | | | | |
|---|---|---|---|---|---|---|---|---|---|---|
| | | 45*[3] | 46 | 47 | 48 | 49 | 50 | 51 | 52 | 53 |
| Specific gravity | 0.98 | 0.98 | 0.98 | 0.98 | 0.98 | 0.98 | 0.98 | 0.98 | 0.98 | 0.98 |
| Hardness, after HDA 15 seconds | 70 | 68 | 75 | 65 | 70 | 71 | 70 | 70 | 70 | 70 |
| Tensile strength, MPa | | | | | | | | | | |
| 23° C. | 15.5 | 10 | 5.2 | 4.8 | 10.5 | 13 | 13.5 | 11.5 | 10 | 14 |
| 120° C. | — | — | — | — | — | — | — | — | — | — |
| 150° C. | — | — | — | — | — | — | — | — | — | — |
| Tensile elongation, % | 550 | 470 | 250 | 200 | 450 | 500 | 500 | 480 | 450 | 530 |
| Stress at 100% elongation, Mpa | — | — | — | — | — | — | — | — | — | — |
| Tearing strength, kN/m | 60 | 52 | 30 | 30 | 40 | 45 | 50 | 48 | 45 | 50 |
| Compression set, % | 52 | 65 | 75 | 90 | 70 | 65 | 60 | 65 | 60 | 70 |
| Taber abrasion, mg | 15 | 80 | 300 | 350 | 200 | 250 | 150 | 200 | 250 | 150 |
| Oil resistance | | | | | | | | | | |
| Weight change, % | — | — | — | — | — | — | — | — | — | — |
| Volume change, % | — | — | — | — | — | — | — | — | — | — |
| Moldability | ◯ | ◯ | × | × | Δ | ◯ | Δ | ◯ | Δ | ◯ |
| Bleedout property | ◯ | ◯ | ◯ | ◯ | ◯ | Δ | ◯ | Δ | ◯ | Δ |
| Adhesive property, kg/25 mm | | | | | | | | | | |
| vinyl chloride | 5 | 1 | — | — | — | — | — | — | — | — |
| polysulfone | 4 | 1.5 | — | — | — | — | — | — | — | — |
| polyphenylene ether | 1 | 0 | — | — | — | — | — | — | — | — |
| ABS | 6 | 3 | — | — | — | — | — | — | — | — |
| polystyrene | 1 | 0 | — | — | — | — | — | — | — | — |
| polymethyl methacrylate | 3 | 1 | — | — | — | — | — | — | — | — |
| polycarbonate | 4 | 1.5 | — | — | — | — | — | — | — | — |
| high-density polyethylene | 0.5 | 0 | — | — | — | — | — | — | — | — |
| polypropylene | 0.5 | 0 | — | — | — | — | — | — | — | — |
| nylon | 5 | 1 | — | — | — | — | — | — | — | — |

*[3]Comparison Example in which component (n), TPAE, was kneaded all in step (I).

In Example 17, the elastomer composition was prepared according to the present process. The properties were good.

Meanwhile, in Comparison Example 45, component (n) was kneaded all in step (I) with the other components in the same composition as in Example 17. The tensile strength, tensile elongation and tearing strength decreased and the taber abrasion increased considerably. The adhesive property decreased for all of the resins. In Comparison Example 46, component (k), (l) and (m) were not blended. The tensile strength, tensile elongation and tearing strength decreased considerably and the taber abrasion increased considerably. The moldability deteriorated considerably. In Comparison Example 47, organic peroxide (h) was not blended. The tensile strength, tensile elongation and tearing strength decreased considerably and the taber abrasion increased considerably. The moldability deteriorated considerably. In Comparison Example 48, component (k) was not blended, while in Comparison Example 49, the amount of component (k) was above the range of the present invention. In both compositions, the tensile strength and tearing strength decreased considerably and the taber abrasion increased considerably. In Comparison Example 48, the moldability deteriorated slightly, while in Comparison Example 49, the bleedout property deteriorated slightly. In Comparison Example 50, component (l) was not blended, while in Comparison Example 51, the amount of component (l) was above the range of the present invention. In both compositions, the tensile strength and tearing strength decreased considerably and the taber abrasion increased considerably. The bleedout property deteriorated slightly. In Comparison Example 50, the moldability deteriorated slightly. In Comparison Example 52, component (m) was not blended, while in Comparison Example 53, the amount of component (m) was above the range of the present invention. In both compositions, the tensile strength and tearing strength decreased considerably and the taber abrasion increased considerably. In Comparison Example 52, the moldability deteriorated slightly, while in Comparison Example 53, the bleedout property deteriorated slightly.

Examples 18 to 20 and Comparison Examples 54 to 58

A polymethylpentene (TPX) was used as component (n).

Each component was used in the amount indicated in Table 17 in part by weight. In Examples 18 and 19, the whole amounts of components (a), (b), (c), (d), (k), (l), (m), (g) and (j) were introduced into a twin-screw extruder with an L/D of 62.5 together with the whole of component (n) and started to be melt kneaded at a kneading temperature of 180 to 220° C. and a screw rotation speed of 350 rpm. Next, the whole amounts of components (h) and (i) were side fed, melt kneaded and pelletized. In Example 20, the whole of components (a), (b), (c), (d), (k), (l), (m), (g) and (j) was introduced into a twin-screw extruder with an L/D of 62.5 and started to be melt kneaded at a kneading temperature of 180 to 210° C. and a screw rotation speed of 350 rpm. Next, the whole of components (h) and (i) was side fed and the melt kneading was still continued. Subsequently, the whole of component (n) was side fed, melt kneaded at 200 to 220° C. and pelletized. In both cases, the properties were then determined as in Example 11.

The results are as shown in Table 18.

In Examples 18 to 20, the elastomer compositions were prepared according to the present process. In Example 18 and 19, component (n) was kneaded all in step (I) and the amount of (n) was varied within the range of the present invention. When the amount of (n) blended was increased, the hardness, tesile strength and elongastion stress increased. In Example 20, component (n) was kneaded all in step (II). It was found that in the case where polymethylpentene (TPX) was used as component (n), there was no change in properties of the elastomers obtained, whether the whole of component (n) was melt kneaded in step (I) or in step (II).

Meanwhile, in Comparison Example 54, component (k) was not blended, while in Comparison Example 55, the amount of component (k) was above the range of the present invention. In both compositions, the hardness increased and the tensile strength, tensile elongation and elongation stress decreased considerably. In Comparison Example 54, the moldability deteriorated considerably while in Comparison Example 55, the bleedout property deteriorated slightly. In Comparison Example 56, the amount of component (l) was above the range of the present invention and component (m) was not blended. The tensile strength, tensile elongation and elongation stress decreased considerably and the bleedout

TABLE 17

| Amount of Component, | Ex. | | | Comparison Example | | | | |
|---|---|---|---|---|---|---|---|---|
| part by weight | 18*[3] | 19*[3] | 20*[4] | 54 | 55 | 56 | 57 | 58 |
| (a) | 100 | 100 | 100 | 100 | 100 | 100 | 100 | 100 |
| (b) | 100 | 100 | 100 | 100 | 100 | 100 | 100 | 100 |
| (c) | 5 | 5 | 5 | 5 | 5 | 5 | 5 | 5 |
| (d) | 15 | 15 | 15 | 15 | 15 | 15 | 15 | 15 |
| (k) | 10 | 10 | 10 | 0 | 40 | 10 | 10 | 10 |
| (l) | 4 | 4 | 4 | 0 | 4 | 20 | 4 | 4 |
| (m) | 4 | 4 | 4 | 0 | 4 | 0 | 20 | 4 |
| (n) TPX | 30 | 60 | 30 | 30 | 30 | 30 | 30 | 5 |
| (g) | 20 | 20 | 20 | 20 | 20 | 20 | 20 | 20 |
| (h) | 1.75 | 1.75 | 1.75 | 1.75 | 1.75 | 1.75 | 1.75 | 1.75 |
| (i) | 3.15 | 3.15 | 3.15 | 3.15 | 3.15 | 3.15 | 3.15 | 3.15 |
| (j) | 0.4 | 0.4 | 0.4 | 0.4 | 0.4 | 0.4 | 0.4 | 0.4 |

*[3]Example in which component (n), TPX, was kneaded all in step (I).
*[4]Example in which component (n), TPX, was kneaded all in step (II).

TABLE 18

| | Ex. | | | Comparison Example | | | | |
|---|---|---|---|---|---|---|---|---|
| | 18*[3] | 19*[3] | 20*[4] | 54 | 55 | 56 | 57 | 58 |
| Specific gravity | 0.92 | 0.91 | 0.92 | 0.92 | 0.92 | 0.92 | 0.92 | 0.92 |
| Hardness, after HDA 15 seconds | 68 | 80 | 68 | 70 | 76 | 66 | 66 | 45 |
| Tensile strength, MPa | | | | | | | | |
| 23° C. | 14.0 | 17.0 | 14.0 | 4.5 | 12.0 | 10.0 | 10.0 | 7.5 |
| 120° C. | 1.2 | 1.6 | 1.2 | 0 | 0.5 | 0.3 | 0.3 | 0 |
| 150° C. | 0.3 | 0.8 | 0.3 | 0 | 0 | 0 | 0 | 0 |
| Tensile elongation, % | 650 | 630 | 650 | 150 | 480 | 550 | 500 | 450 |
| Stress at 100% elongation, MPa | 4.8 | 5.2 | 4.8 | 3.8 | 4.0 | 4.2 | 4.0 | 2.3 |
| Tearing strength, kN/m | — | — | — | — | — | — | — | — |
| Compression set, % | — | — | — | — | — | — | — | — |
| Taber abrasion, mg | — | — | — | — | — | — | — | — |
| Oil resistance | | | | | | | | |
| Weight change, % | — | — | — | — | — | — | — | — |
| Volume change, % | — | — | — | — | — | — | — | — |
| Moldability | ○ | ○ | ○ | × | ○ | ○ | ○ | ○ |
| Bleedout property | ○ | ○ | ○ | ○ | Δ | Δ | Δ | ○ |

*[3]Example in which component (n), TPX, was kneaded all in step (I).
*[4]Example in which component (n), TPX, was kneaded all in step (II).

property deteriorated slightly. In Comparison Example 57, the amount of component (m) was above the range of the present invention. The tensile strength, tensile elongation and elongation stress decreased and the bleedout property deteriorated slightly. In Comparison Example 58, the amount of component (n) was below the range of the present invention. The hardness, tensile strength, tensile elongation and elongation stress decreased considerably.

Examples 21 to 23 and Comparison Examples 59 to 66

Nylon-6 was used as component (n).

Each component was used in the amount indicated in Table 19 in part by weight. In Examples 21 and 22, the whole of component (n) was melt kneaded in step (I), while in Example 23, the whole of component (n) was melt kneaded in step (II). The melt kneading and the determination of the properties were carried out in the same conditions as in the case of polymethylpentene mentioned above.

The results are as shown in Table 20.

to 22, component (n) was kneaded all in step (I) and the amount of (n) was varied within the range of the present invention. When the amount of (n) blended was increased, the hardness, tesile strength, tensile elongation, elongastion stress and compression set increased, and the oil resistance improved, and the taber abrasion decreased. In Example 23, component (n) was kneaded all in step (II). It was found that in the case where nylon-6 was used as component (n), there was no change in properties of the elastomers obtained, whether the whole of component (n) was melt kneaded in step (I) or in step (II).

Meanwhile, in Comparison Example 59, component (k) was not blended, while in Comparison Example 60, the amount of component (k) was above the range of the present invention. In Comparison Example 59, the tensile strength, tensile elongation and elongation stress decreased and the taber abrasion increased considerably. The oil resistance deteriorated considerably. The moldability deteriorated also considerably. In Comparison Example 60, the hardness, tensile strength, tensile elongation and elongation stress decreased and the taber abrasion increased considerably. The

TABLE 19

| Amount of Component, part by weight | Ex. | | | Comparison Example | | | | | | | |
|---|---|---|---|---|---|---|---|---|---|---|---|
| | 21*³ | 22*³ | 23*⁴ | 59 | 60 | 61 | 62 | 63 | 64 | 65 | 66 |
| (a) | 100 | 100 | 100 | 100 | 100 | 100 | 100 | 100 | 100 | 100 | 100 |
| (b) | 100 | 100 | 100 | 100 | 100 | 100 | 100 | 100 | 100 | 100 | 100 |
| (c) | 5 | 5 | 5 | 5 | 5 | 5 | 5 | 5 | 5 | 5 | 5 |
| (d) | 15 | 15 | 15 | 15 | 15 | 15 | 15 | 15 | 15 | 15 | 15 |
| (k) | 10 | 10 | 10 | 0 | 40 | 10 | 10 | 10 | 10 | 10 | 10 |
| (l) | 4 | 4 | 4 | 4 | 4 | 0 | 20 | 4 | 4 | 4 | 4 |
| (m) | 4 | 4 | 4 | 4 | 4 | 4 | 4 | 0 | 20 | 4 | 4 |
| (n) nylon-6 | 30 | 60 | 30 | 30 | 30 | 30 | 30 | 30 | 30 | 30 | 5 |
| (g) | 20 | 20 | 20 | 20 | 20 | 20 | 20 | 20 | 20 | 20 | 20 |
| (h) | 1.75 | 1.75 | 1.75 | 1.75 | 1.75 | 1.75 | 1.75 | 1.75 | 1.75 | 0 | 1.75 |
| (i) | 3.15 | 3.15 | 3.15 | 3.15 | 3.15 | 3.15 | 3.15 | 3.15 | 3.15 | 0 | 3.15 |
| (j) | 0.4 | 0.4 | 0.4 | 0.4 | 0.4 | 0.4 | 0.4 | 0.4 | 0.4 | 0.4 | 0.4 |

*³Example in which component (n), nylon-6, was kneaded all in step (I).
*⁴Example in which component (n), nylon-6, was kneaded all in step (II)

TABLE 20

| Properties of the composition | Ex. | | | Comparison Example | | | | | | | |
|---|---|---|---|---|---|---|---|---|---|---|---|
| | 21*³ | 22*³ | 23*⁴ | 59 | 60 | 61 | 62 | 63 | 64 | 65 | 66 |
| Specific gravity | 0.93 | 0.93 | 0.93 | 0.93 | 0.93 | 0.93 | 0.93 | 0.93 | 0.93 | 0.93 | 0.92 |
| Hardness, after HDA 15 seconds | 70 | 82 | 70 | 70 | 66 | 70 | 66 | 70 | 68 | 55 | 48 |
| Tensile strength, MPa | | | | | | | | | | | |
| 23° C. | 10.0 | 15.0 | 10.0 | 7.0 | 9.0 | 8.0 | 7.0 | 9.0 | 8.5 | 3.0 | 5.0 |
| 120° C. | 1.5 | 1.9 | 1.5 | 0.7 | 0.8 | 0.8 | 0.8 | 0.8 | 0.9 | 0 | 0 |
| 150° C. | 0.5 | 0.8 | 0.5 | 0 | 0 | 0 | 0 | 0 | 0 | 0 | 0 |
| Tensile elongation, % | 450 | 500 | 450 | 400 | 420 | 380 | 350 | 400 | 420 | 250 | 350 |
| Stress at 100% elongation, MPa | 4.5 | 4.8 | 4.5 | 3.5 | 3.3 | 3.5 | 3.0 | 3.8 | 3.5 | 1.3 | 1.8 |
| Tearing strength, kN/m | — | — | — | — | — | — | — | — | — | — | — |
| Compression set, % | 60 | 63 | 60 | 70 | 65 | 65 | 70 | 65 | 70 | 80 | 70 |
| Taber abrasion, mg | 100 | 60 | 100 | 200 | 250 | 200 | 200 | 200 | 250 | 450 | 400 |
| Oil resistance | | | | | | | | | | | |
| Weight change, % | 30 | 25 | 30 | 50 | — | — | — | — | — | 100 | 80 |
| Volume change, % | 25 | 18 | 25 | 42 | — | — | — | — | — | 90 | 70 |
| Moldability | ○ | ○ | ○ | × | ○ | ○ | ○ | ○ | ○ | Δ | ○ |
| Bleedout property | ○ | ○ | ○ | ○ | Δ | Δ | Δ | ○ | ○ | ○ | ○ |

*³Example in which component (n), nylon-6, was kneaded all in step (I).
*⁴Example in which component (n), nylon-6, was kneaded all in step (II)

In Examples 21 to 23, the elastomer compositions were prepared according to the present process. In Examples 21 bleedout property deteriorated slightly. In Comparison Example 61, component (l) was not blended, while in Comparison Example 62, the amount of component (l) was above the range of the present invention. In Comparison Example 61, the tensile strength, tensile elongation and elongation stress decreased and the taber abrasion increased considerably. The bleedout property deteriorated slightly. In Comparison Example 62, the hardness, tensile strength, tensile elongation and elongation stress decreased and the taber abrasion increased considerably. The bleedout property deteriorated slightly. In Comparison Example 63, component (m) was not blended, while in Comparison Example 64, the amount of component (m) was above the range of the present invention. In both compositions, the tensile strength, tensile elongation and elongation stress decreased and the taber abrasion increased considerably. In Comparison Example 65, component (h), organic peroxide, was not blended. The hardness, tensile strength, tensile elongation and elongation stress decreased considerably and the oil resistance deteriorated considerably. The taber abrasion increased considerably. The moldability deteriorated also. In Comparison Example 66, the amount of component (n) was below the range of the present invention. The hardness, tensile strength, tensile elongation and elongation stress decreased considerably. The oil resistance deteriorated considerably and the taber abrasion increased considerably.

I claim:

1. A process for the preparation of a thermoplastic elastomeric resin composition comprising melt kneading
    (a) 100 parts by weight of a block copolymer consisting of at least two polystyrene blocks (A) and at least one hydrogenated polyisoprene block (B) wherein from 70 to 100% by weight of isoprene is in 1,4-microstructure and at least 90% of the aliphatic double bonds derived from isoprene are hydrogenated,
    (b) from 20 to 300 parts by weight of a non-aromatic softening agent for rubber, in which from 0 to 30% of the whole carbon atoms are in aromatic rings,
    (c) from 1 to 150 parts by weight of a peroxide-crosslinking olefinic resin selected from the group consisting of modified polyethylenes and modified copolymeric rubbers of ethylene, the modification being made with a group which is able to react with a hydroxyl, carboxyl or amino group, and
    (d) from 10 to 150 parts by weight of a peroxide-decomposing olefinic resin selected from the group consisting of polypropylenes and copolymers of propylene with a smaller amount of another α-olefine,
    characterized in that the process comprises a step of heat-processing component (a), component (b), at least a part of component (c), at least a part of component (d) and at least a part of from 1.0 to 1,200 parts by weight of component (e) in the presence of an organic peroxide to cause crosslinking, wherein component (e) is at least one thermoplastic polymer selected from the group consisting of polyester (co)polymers, polyamide (co)polymers and polyurethane (co)polymers, and a subsequent step of blending these with the remaining part of component (c), and the remaining part of component (d) and component (e), if any.

2. The process as described in claim 1, wherein component (c) is one which is modified with a carboxyl, acid anhydride, epoxy or oxazolinyl group.

3. The process as described in claim 1, wherein (f) at most 100 parts by weight of a hydrogenated petroleum resin are further blended before said heat-processing.

4. The process as described in claim 1, wherein (g) at most 100 parts by weight of an inorganic filler are blended in any step.

5. The process as described in claim 1, wherein at least 3 parts by weight of component (d) are subjected to said heat-processing in the presence of an organic peroxide and at least 5 parts by weight of component (d) are blended after said heat-processing.

6. The process as described in claim 1, wherein at least 1 part by weight of component (c) is subjected to said heat-processing.

7. The process as described in claim 1, wherein at least 10 parts by weight of component (e) are subjected to said heat-processing.

8. The process as described in claim 1, wherein the crosslinking is carried out in the presence of a crosslinking aid which is a monomer having an ethylenically unsaturated group.

9. The process as described in claim 1, wherein the organic peroxide is used in an amount of 0.1 to 4.0 parts by weight.

10. A thermoplastic elastomeric resin composition comprising
    (a) 100 parts by weight of a block copolymer consisting of at least two polystyrene blocks (A) and at least one hydrogenated polyisoprene block (B) wherein from 70 to 100% by weight of isoprene is in 1,4-microstructure and at least 90% of the aliphatic double bonds derived from isoprene are hydrogenated,
    (b) from 20 to 300 parts by weight of a non-aromatic softening agent for rubber in which from 0 to 30% of the whole carbon atoms are in aromatic rings,
    (c) from 1 to 150 parts by weight of a peroxide-crosslinking olefinic resin selected from the group consisting of modified polyethylenes and modified copolymeric rubbers of ethylene, the modification being made with a group which is able to react with a hydroxyl, carboxyl or amino group, and
    (d) from 10 to 150 parts by weight of a peroxide-decomposing olefinic resin selected from the group consisting of polypropylenes and copolymers of propylene with a smaller amount of another α-olefine, characterized in that said composition further comprises
    (e) from 1.0 to 1,200 parts by weight of at least one polymer selected from the group consisting of polyester (co)polymers, polyamide (co)polymers and polyurethane (co)polymers, and component (c) is modified with a group which is able to react with a hydroxyl, carboxyl or amino group.

11. The thermoplastic elastomeric resin composition as described in claim 10, wherein component (c) is one which is modified with a carboxyl, acid anhydride, epoxy or oxazolinyl group.

12. The thermoplastic elastomeric resin composition as described in claim 10, wherein the composition further comprises (f) at most 100 parts by weight of a hydrogenated petroleum resin.

13. The thermoplastic elastomeric resin composition as described in claim 10, wherein the composition further comprises (g) at most 100 parts by weight of an inorganic filler.

14. The thermoplastic elastomeric resin composition as described in claim 10, wherein the composition further comprises 0.1 to 10 parts by weight of a crosslinking aid which is a monomer having an ethylenically unsaturated group.

* * * * *